(12) United States Patent
Wakita et al.

(10) Patent No.: US 10,661,221 B2
(45) Date of Patent: May 26, 2020

(54) ELECTROCHEMICAL HYDROGEN COMPRESSION APPARATUS

(71) Applicant: Panasonic Intellectual Property Management Co., Ltd., Osaka (JP)

(72) Inventors: Hidenobu Wakita, Kyoto (JP); Yasuhiko Itoh, Kyoto (JP); Yusuke Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 188 days.

(21) Appl. No.: 15/808,888

(22) Filed: Nov. 10, 2017

(65) Prior Publication Data

US 2018/0166713 A1 Jun. 14, 2018

(30) Foreign Application Priority Data

Dec. 13, 2016 (JP) .................. 2016-241598

(51) Int. Cl.
*B01D 53/32* (2006.01)
*B01D 19/00* (2006.01)
(Continued)

(52) U.S. Cl.
CPC ....... *B01D 53/326* (2013.01); *B01D 19/0063* (2013.01); *C25B 1/02* (2013.01);
(Continued)

(58) Field of Classification Search
CPC ........... B01D 53/326; C25B 1/10; C25B 1/12; C25B 15/02
See application file for complete search history.

(56) References Cited

U.S. PATENT DOCUMENTS

2007/0246374 A1 10/2007 Eisman et al.
2009/0169927 A1 7/2009 Sato et al.
(Continued)

FOREIGN PATENT DOCUMENTS

| JP | 2006-070322 | 3/2006 |
| JP | 2010-189707 | 9/2010 |
| JP | 2015-117139 | 6/2015 |

OTHER PUBLICATIONS

The Extended European Search Report dated Feb. 26, 2018 for the related European Patent Application No. 17206324.0.

*Primary Examiner* — Nicholas A Smith
(74) *Attorney, Agent, or Firm* — McDermott Will & Emery LLP

(57) ABSTRACT

An apparatus includes a proton-conducting electrolyte membrane, an anode, a cathode, a first flow path which is disposed on the anode and through which an anode fluid containing hydrogen as a constituent element flows, a second flow path which is disposed on the cathode and through which hydrogen flows, a voltage applicator, a detector which detects a hydrogen cross leak amount passing through the membrane, where the detector detects the hydrogen cross leak amount from, a natural potential of one electrode of the cathode and the anode after forming a state where hydrogen is present at the one electrode and hydrogen is not present at the other electrode of the cathode and the anode, or a current flowing between the anode and the cathode when the voltage is applied from the voltage applicator in a state where the first flow path and the second flow path are both sealed off.

12 Claims, 14 Drawing Sheets

(51) Int. Cl.
*C25B 15/02* (2006.01)
*C25B 1/02* (2006.01)
*C25B 1/10* (2006.01)
*C25B 1/12* (2006.01)
*C25B 9/00* (2006.01)
*H01M 8/04089* (2016.01)
*H01M 8/04664* (2016.01)
*F17C 11/00* (2006.01)
*H01M 8/0662* (2016.01)

(52) U.S. Cl.
CPC .................. *C25B 1/10* (2013.01); *C25B 1/12* (2013.01); *C25B 15/02* (2013.01); *F17C 11/005* (2013.01); *H01M 8/04089* (2013.01); *H01M 8/04686* (2013.01); *C25B 9/00* (2013.01); *H01M 8/0681* (2013.01); *H01M 2250/20* (2013.01); *Y02T 90/32* (2013.01)

(56) References Cited

U.S. PATENT DOCUMENTS

| | | | |
|---|---|---|---|
| 2010/0285379 A1* | 11/2010 | Schrieber | H01M 8/04201 429/432 |
| 2013/0164645 A1 | 6/2013 | Takaichi et al. | |
| 2014/0363751 A1 | 12/2014 | Blanchet et al. | |

\* cited by examiner

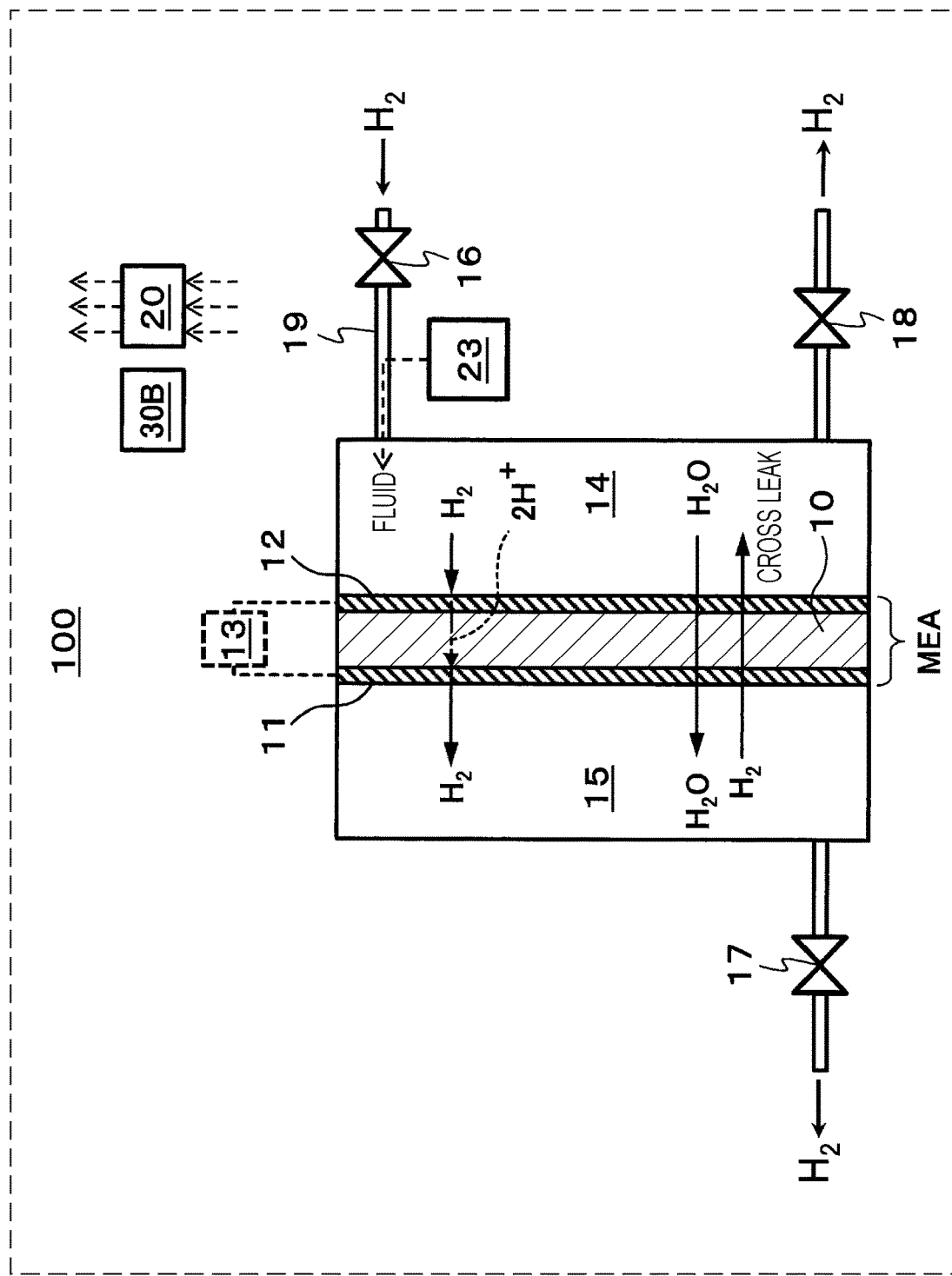

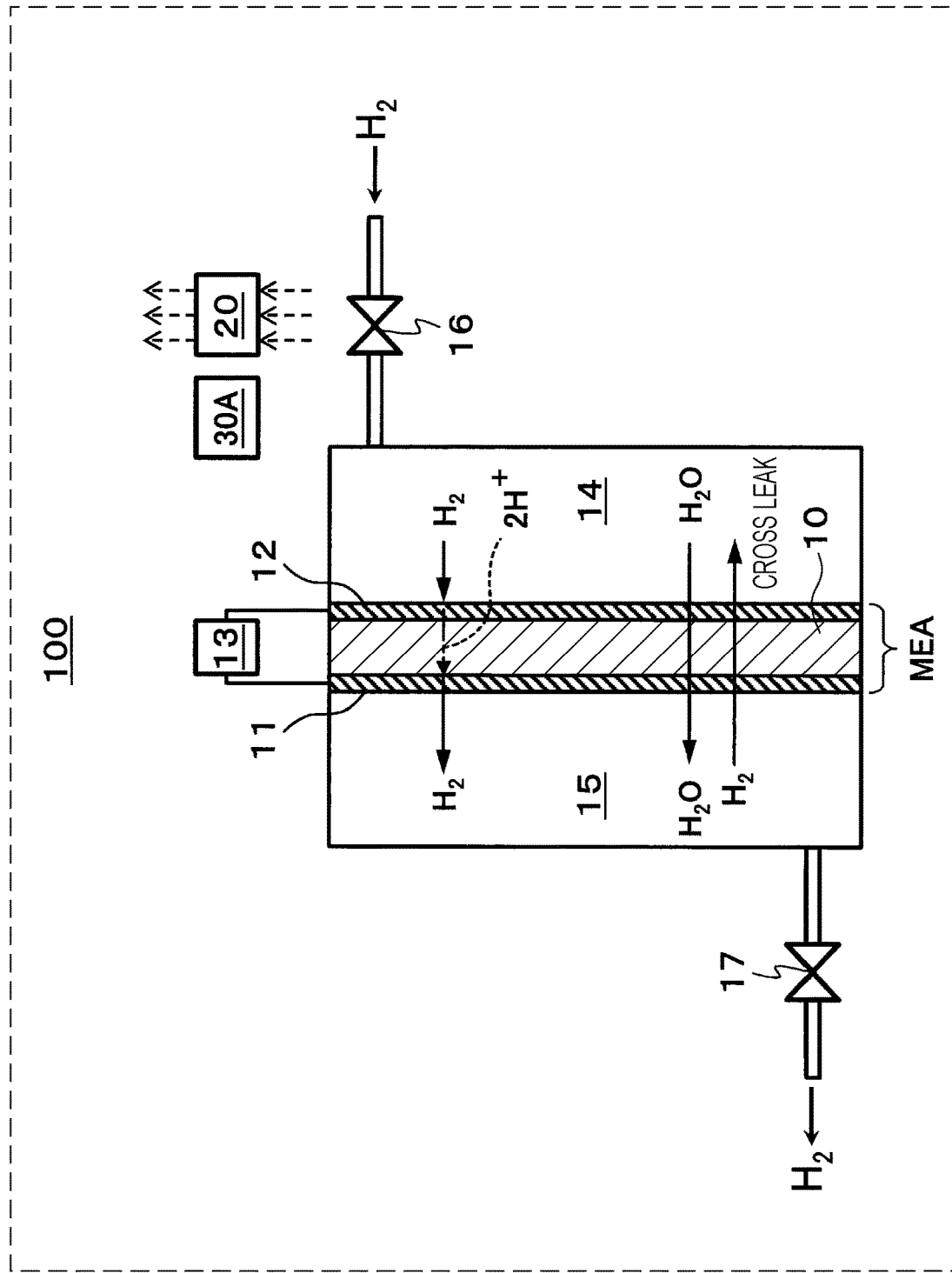

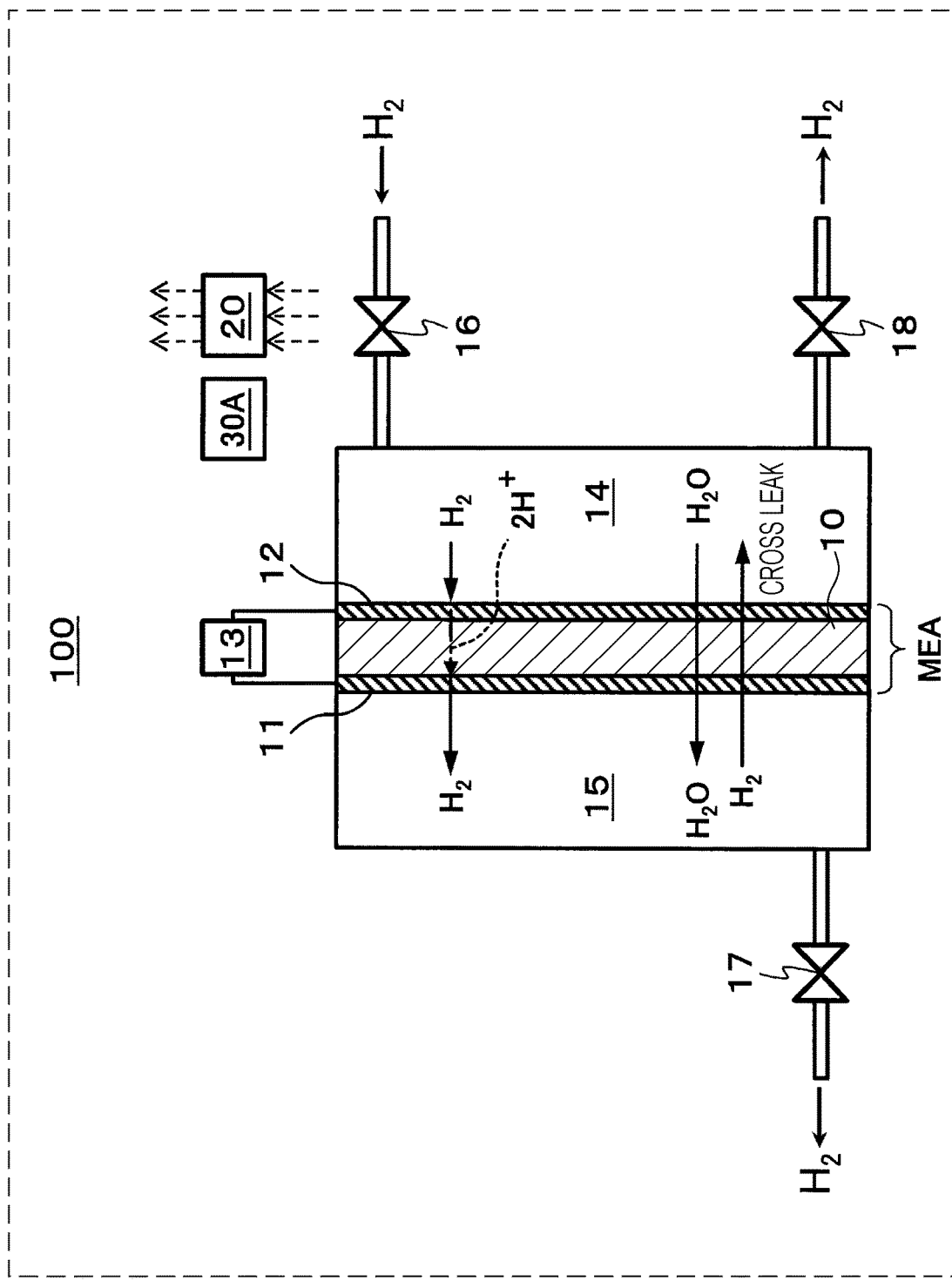

ELECTROCHEMICAL HYDROGEN COMPRESSION APPARATUS

BACKGROUND

1. Technical Field

The present disclosure relates to an electrochemical hydrogen compression apparatus.

2. Description of the Related Art

Recently, from the viewpoint of improving fuel economy and utilizing carbon-free fuel, fuel cell vehicles generating electric power by fuel cells and running with motors driven by the generated electric power have received attention, and launching of the fuel cell vehicles into markets have started. In achieving widespread use of the fuel cell vehicles, however, there is a problem of whether it is possible to prepare an infrastructure for supplying hydrogen as fuel and to install hydrogen stations in a large number over wide regions across the country. Up to date, a method of purifying and compressing hydrogen with the pressure swing adsorption (PSA) process, for example, has been put into practice in the hydrogen stations, but a large-sized apparatus, a huge installation cost, etc. have impeded nation-wide installation of the hydrogen stations.

Thus, in view of the coming hydrogen society, technical development is demanded which can progress techniques for not only producing hydrogen, but also storing hydrogen at a high density and transporting or utilizing hydrogen in units of small capacity at a low cost. Particularly, a fuel supply infrastructure needs to be prepared in order to promote further widespread use of fuel cells that serve as decentralized energy sources. Furthermore, various proposals for purifying and boosting high-purity hydrogen are made to stably supply hydrogen to the fuel supply infrastructure.

For example, Japanese Unexamined Patent Application Publication No. 2015-117139 discloses a hydrogen purifying and boosting system in which hydrogen is purified and boosted by disposing an electrolyte membrane between an anode and a cathode, and by applying a voltage between the anode and the cathode. A multilayer structure of the anode, the electrolyte membrane, and the cathode is called a Membrane Electrode Assembly (hereinafter abbreviated to "MEA" in some cases). In the disclosed system, when a current flows between the anode and the cathode, hydrogen at the anode becomes a proton, and the proton drifts from the anode to the cathode through the electrolyte membrane while accompanying with a water molecule.

There is also proposed an apparatus in which oxygen is generated on the anode side of the MEA and hydrogen is generated on the cathode side by applying a voltage between the anode and the cathode of the MEA, and by electrolytically decomposing water supplied to the anode of the MEA (see, for example, Japanese Unexamined Patent Application Publication No. 2006-70322).

In addition, with respect to a system for sealing, under high pressure, hydrogen generated at the cathode during hydrolysis of water, there is proposed a method of detecting a leak of hydrogen from the cathode to the anode through the electrolyte on the basis of time-dependent change of data detected by a pressure gauge (see, for example, Japanese Patent No. 5341547).

SUMMARY

In the related-art techniques, however, detection of a cross leak amount of hydrogen gas leaking from the cathode to the anode of the MEA (hereinafter abbreviated to "hydrogen cross leak amount" in some cases) is not studied sufficiently.

One non-limiting and exemplary embodiment provides an apparatus capable of more appropriately detecting the hydrogen cross leak amount passing through a proton-conducting electrolyte membrane than the related-art techniques.

In one general aspect, the techniques disclosed here feature an apparatus including a proton-conducting electrolyte membrane, an anode disposed on one principal surface of the proton-conducting electrolyte membrane, a first flow path which is disposed on the anode and through which an anode fluid containing hydrogen as a constituent element flows, a cathode disposed on the other principal surface of the proton-conducting electrolyte membrane, a second flow path which is disposed on the cathode and through which hydrogen flows, a voltage applicator which applies a voltage between the anode and the cathode, and a first detector which detects a hydrogen cross leak amount passing through the proton-conducting electrolyte membrane, wherein the first detector detects the hydrogen cross leak amount from a natural potential of one electrode of the cathode and the anode after forming a state where hydrogen is present at the one electrode and hydrogen is not present at the other electrode of the cathode and the anode, or a current flowing between the anode and the cathode when the voltage is applied from the voltage applicator in a state where the first flow path and the second flow path are both sealed off.

The apparatus according to the one general aspect has the advantageous effect that the apparatus can more appropriately detect the hydrogen cross leak amount passing through a proton-conducting electrolyte membrane than the related-art techniques.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 illustrates one example of an electrochemical hydrogen compression apparatus according to a third embodiment;

FIG. 9 illustrates one example of an electrochemical hydrogen compression apparatus according to a fourth embodiment;

FIG. 10 illustrates one example of an electrochemical hydrogen compression apparatus according to a modification of the fourth embodiment;

DETAILED DESCRIPTION

Figure 1:
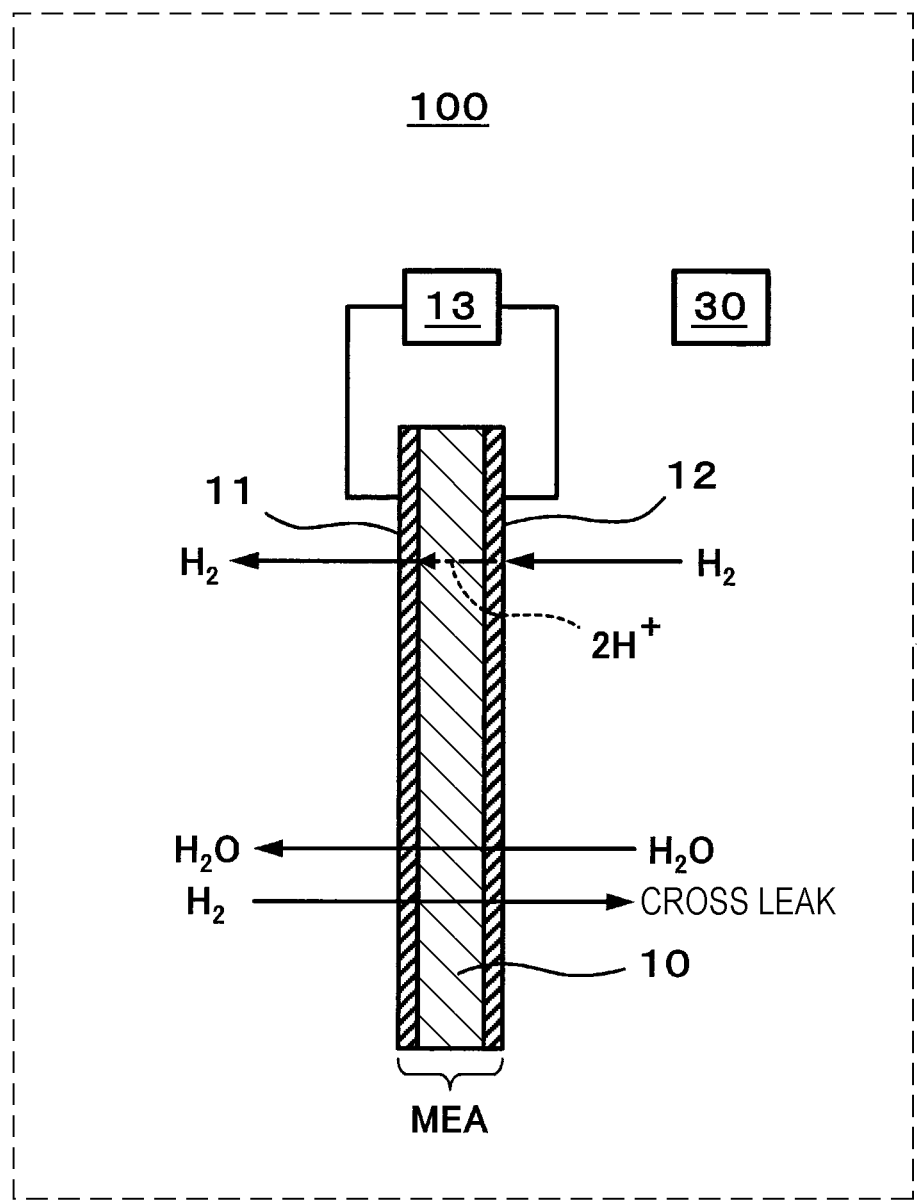
FIG. 1 illustrates one example of an electrochemical hydrogen compression apparatus according to a first embodiment.

An apparatus according to a first aspect of the present disclosure includes a proton-conducting electrolyte membrane, an anode disposed on one principal surface of the proton-conducting electrolyte membrane, a first flow path which is disposed on the anode and through which an anode fluid containing hydrogen as a constituent element flows, a cathode disposed on the other principal surface of the proton-conducting electrolyte membrane, a second flow path which is disposed on the cathode and through which hydrogen flows, a voltage applicator which applies a voltage between the anode and the cathode, and a first detector which detects a hydrogen cross leak amount passing through the proton-conducting electrolyte membrane, wherein the first detector detects the hydrogen cross leak amount from a natural potential of one electrode of the cathode and the anode after forming a state where hydrogen is present at the one electrode and hydrogen is not present at the other electrode of the cathode and the anode, or a current flowing between the anode and the cathode when the voltage is applied from the voltage applicator in a state where the first flow path and the second flow path are both sealed off.

With the features described above, the apparatus according to the first aspect can more appropriately detect the hydrogen cross leak amount passing through the proton-conducting electrolyte membrane than with the related-art techniques.

The amount of hydrogen cross-leaking from the cathode to the anode increases with the progress of deterioration of the proton-conducting electrolyte membrane in the apparatus. Taking into consideration the above point, the inventors have gained the conception of determining the progress of the deterioration of the proton-conducting electrolyte membrane from the hydrogen cross leak amount.

Thus, according to a second aspect of the present disclosure, the apparatus according to the first aspect may further include a determiner which determines progress of deterioration of the proton-conducting electrolyte membrane to be in an advanced state when the hydrogen cross leak amount detected by the first detector has increased with continued use of the apparatus.

With the feature described above, the apparatus according to the second aspect can appropriately determine the progress of the deterioration of the proton-conducting electrolyte membrane by detecting the hydrogen cross leak amount passing through the proton-conducting electrolyte membrane with the first detector.

According to a third aspect of the present disclosure, in the apparatus according to the first or second aspect, the first detector may detect the hydrogen cross leak amount at timing of at least one of startup and stop of the apparatus.

According to a fourth aspect of the present disclosure, the apparatus according to any one of the first to third aspects may further include a purger which purges hydrogen present at the other electrode with a fluid different from hydrogen, and a controller which controls the purger to purge the hydrogen present at the other electrode with the fluid at timing of detecting the hydrogen cross leak amount by the first detector.

With the feature described above, the apparatus according to the fourth aspect can easily form the state where hydrogen is not present at the other of two electrodes of an MEA (i.e., the other of the cathode and the anode), by purging the hydrogen, which is present at the other electrode of the MEA, with the fluid different from hydrogen. As a result, in comparison with the case of not including the purger, the hydrogen cross leak amount can be more appropriately detected from the natural potential of the one electrode of the MEA under a condition after forming the state where hydrogen is present at the one electrode of the MEA and hydrogen is not present at the other electrode of the MEA.

According to a fifth aspect of the present disclosure, the apparatus according to any one of the first to fourth aspects may further include a first valve disposed at an inlet of the first flow path, a second valve disposed at an outlet of the second flow path, and a controller which controls the first valve and the second valve, wherein an outlet of the first flow path may be sealed off, and the controller may close the first valve and the second valve to seal off both the first flow path and the second flow path, at timing of detecting the hydrogen cross leak amount by the first detector.

With the features described above, the apparatus according to the fifth embodiment can easily form the state where the first flow path and the second flow path are both sealed off, by closing the first valve and the second valve at appropriate timing. As a result, in comparison with the case of not including the first valve and the second valve, the hydrogen cross leak amount can be more appropriately detected from a current flowing between the anode and the cathode when the voltage is applied from the voltage applicator in the state where the first flow path and the second flow path are both sealed off.

According to a sixth aspect of the present disclosure, the apparatus according to any one of the first to fourth aspects may further include a first valve disposed at an inlet of the first flow path, a second valve disposed at an outlet of the second flow path, a third valve disposed at an outlet of the first flow path, and a controller which controls the first valve, the second valve, and the third valve, wherein the controller may close the first valve, the second valve, and the third valve, to seal off both the first flow path and the second flow path, at timing of detecting the hydrogen cross leak amount by the first detector.

With the features described above, the apparatus according to the sixth aspect can easily form the state where the first flow path and the second flow path are both sealed off, by closing the first valve, the second valve, and the third valve at appropriate timing. As a result, in comparison with the case of not including the first valve, the second valve, and the third valve, the hydrogen cross leak amount can be more appropriately detected from a current flowing between the anode and the cathode when the voltage is applied from the voltage applicator in the state where the first flow path and the second flow path are both sealed off.

According to a seventh aspect of the present disclosure, the apparatus according to any one of the first to sixth aspects may further include an annunciator which issues information denoting an increase in the hydrogen cross leak amount when the hydrogen cross leak amount detected by the first detector has increased.

With the feature described above, in comparison with the case of not including such an annunciator, the apparatus according to the seventh aspect makes it possible to recognize an increase in the hydrogen cross leak amount passing through the proton-conducting electrolyte membrane at more appropriate timing.

According to an eighth aspect of the present disclosure, the apparatus according to the second aspects may further include an annunciator which issues information denoting progress of the deterioration of the proton-conducting electrolyte membrane as being advanced when the determiner determines which the deterioration of the proton-conducting electrolyte membrane has progressed.

With the feature described above, in comparison with the case of not including such an annunciator, the apparatus according to the eighth embodiment makes it possible to recognize the progress of the deterioration of the proton-conducting electrolyte membrane at more appropriate timing. Thus, stable hydrogen compression operation of the apparatus can be ensured by issuing the information denoting the progress of the deterioration of the proton-conducting electrolyte membrane.

When the amount of hydrogen cross-leaking from the cathode to the anode increases with, for example, the progress of the deterioration of the proton-conducting electrolyte membrane, compression efficiency of the apparatus reduces. However, the apparatus according to the eighth aspect can appropriately cope with the above-mentioned problem by issuing the information as described above. In addition, when the progress of the deterioration of the proton-conducting electrolyte membrane is advanced, there is a possibility which the proton-conducting electrolyte membrane may be damaged and the apparatus may be failed. However, the apparatus according to the eighth embodiment can reduce such a possibility by issuing the information as described above.

According to a ninth aspect of the present disclosure, the apparatus according to any one of the first to eighth aspects may further include a pressure gauge which measures a pressure in the first flow path in which the cathode is accommodated, and a second detector which detects a leak of hydrogen to the outside from both time-dependent change of the pressure measured by the pressure gauge and time-dependent change of the hydrogen cross leak amount detected by the first detector.

With the feature described above, the apparatus according to the ninth embodiment makes it possible to estimate, on the basis of the time-dependent change of the hydrogen cross leak amount detected by the first detector, a contribution of the hydrogen cross leak amount with respect to data (e.g., a decrease amount) detected by the pressure gauge. Thus, a leak of the hydrogen gas to the outside can be appropriately determined by employing the second detector.

Embodiments of the present disclosure will be described in detail below with reference to the drawings. It is to be noted that the embodiments described below represent non-exclusive or specific examples. Numerical values, shapes, materials, components, layout positions and connection forms of the components, which are described in the following embodiments, are merely illustrative, and they are not purported to limit the present disclosure. Among the components in the following embodiments, those ones not stated in the independent claim, which defines the most significant concept, are described as optional components. Duplicate description of the components denoted by the same reference signs in the drawings may be omitted in some cases. The individual components are schematically illustrated in simplified forms for easier understanding of the drawings, and shapes of the components, a dimension ratio between or among the components, etc. are not illustrated exactly in a strict sense in some cases.

First Embodiment

Apparatus Configuration

FIG. 1 illustrates one example of an electrochemical hydrogen compression apparatus according to a first embodiment.

In the embodiment illustrated in FIG. 1, an electrochemical hydrogen compression apparatus 100 includes a proton-conducting electrolyte membrane 10, a cathode 11, an anode 12, a voltage applicator 13, and a first detector 30.

The proton-conducting electrolyte membrane 10 may be of any suitable structure insofar as the electrolyte membrane has proton conductivity.

An example of the proton-conducting electrolyte membrane 10 may be a polymer electrolyte membrane. An example of the polymer electrolyte membrane may be a fluorine-based polymer electrolyte membrane. More specifically, Nafion (registered trademark, made by DuPont) or Aciplex (trade name, made by Asahi Kasei Corporation), for example, may be used.

The anode 12 is an electrode disposed on one principal surface of the proton-conducting electrolyte membrane 10. The anode 12 includes an anode catalyst layer that is disposed on the one principal surface of the proton-conducting electrolyte membrane 10. The anode catalyst layer may contain platinum (Pt) as a catalyst metal, but the catalyst metal is not limited to Pt. The anode catalyst layer may be of any suitable structure insofar as it contains a catalyst containing Pt, for example, as the catalyst metal.

The cathode 11 is an electrode disposed on the other principal surface of the proton-conducting electrolyte membrane 10. The cathode 11 includes a cathode catalyst layer that is disposed on the other principal surface of the proton-conducting electrolyte membrane 10. The cathode catalyst layer may contain platinum (Pt) as a catalyst metal, but the catalyst metal is not limited to Pt. The cathode catalyst layer may be of any suitable structure insofar as it contains a catalyst containing Pt, for example, as the catalyst metal.

The voltage applicator 13 is a device that applies a voltage between the anode 12 and the cathode 11. More specifically, a high-potential side terminal of the voltage applicator 13 is connected to the anode 12, and a low-potential side terminal of the voltage applicator 13 is connected to the cathode 11. A current flows between the anode 12 and the cathode 11 with the application of the voltage by the voltage applicator 13. The voltage applicator 13 may be of any suitable structure insofar as allowing a current to flow between the anode 12 and the cathode 11.

The voltage applicator 13 may be a device that adjusts the voltage applied between the anode 12 and the cathode 11. For example, a DC/DC converter or an AC/DC converter may be used as the voltage applicator 13. The DC/DC converter is used when the voltage applicator 13 is connected to a DC power supply such as a battery. The AC/DC converter is used when the voltage applicator 13 is connected to an AC power supply such as a commercial power supply.

The first detector 30 is a device that detects a hydrogen cross leak amount passing through the proton-conducting electrolyte membrane 10. More specifically, the first detector 30 detects the hydrogen cross leak amount from a natural potential of one of two electrodes (cathode and anode) of an MEA after bringing the MEA into a state where hydrogen is present at the one electrode of the MEA and hydrogen is not present at the other electrode of the MEA, or from a current flowing between the anode 12 and the cathode 11 when a voltage is applied from the voltage applicator 13 in a state where the anode 12 and the cathode 11 are both sealed off.

Details of the above-mentioned method of detecting the hydrogen cross leak amount from the natural potential of the one electrode is described later in a second example. Details of the above-mentioned method of detecting the hydrogen cross leak amount from the current flowing between the anode 12 and the cathode 11 is described later in a first example.

Though not illustrated in the drawing, other components needed for carrying out a hydrogen compression operation of the electrochemical hydrogen compression apparatus 100 are disposed as appropriate.

For instance, the electrochemical hydrogen compression apparatus 100 includes a conductive separator that supplies hydrogen gas to the anode 12. The separator is a plate-like member including a fluid channel through which hydrogen gas is supplied to the anode 12. The separator may be of any suitable structure insofar as it is able to supply hydrogen gas to the anode 12.

In an example, a pair of carbon-made separators may be disposed in a sandwiching relation to the anode 12 and the cathode 11 of the MEA from the outer side.

Usually, in the electrochemical hydrogen compression apparatus 100, sealing materials, such as gaskets, are disposed at both the sides of the MEA and are integrally assembled with the MEA in advance to prevent high-pressure hydrogen gas from leaking to the outside. Furthermore, the above-mentioned separators are arranged on the outer side of the MEA to not only mechanically fix the assembled members, but also to electrically connect the adjacent MEA's to each other in series. In a portion of the separator coming into contact with the anode 12 of the MEA, the above-mentioned fluid channel is formed to supply hydrogen gas to the MEA and to carry away extra hydrogen gas from the MEA. Although the fluid channel may be provided discretely from the separator, it is generally provided by forming a groove for the fluid channel in a surface of the separator in a serpentine shape, for example.

A general multilayer structure is constituted by alternately stacking the MEA and the separator into a multilayer body having 10 to 200 cells, sandwiching the multilayer body between end plates in a state where a current collection plate and an insulating plate are interposed between the multilayer body and each of the end plates, and by tightly fastening both the end plates with fastening rods. In such a case, it is needed to branch a groove-like branch path from an appropriate piping to each of the separators, and to couple a downstream end of the branch path to the fluid channel of each separator in order that a proper amount of hydrogen gas is supplied to the fluid channel of each separator. That piping is called a manifold, and the manifold is constituted by a group of connected through-holes that are formed at appropriate positions of the separators.

It is to be noted that the foregoing components not represented in the drawings are explained just illustratively, and that those components are not limited to the above-mentioned examples.

A controller (not illustrated in FIG. 1) may control the hydrogen compression operation (operation process) of the electrochemical hydrogen compression apparatus 100. The controller may be of any suitable configuration insofar as it has the control function. The controller may include, for example, an arithmetic circuit and a storage circuit that stores a control program. The arithmetic circuit may be, for example, an MPU or a CPU. The storage circuit may be, for example, a memory. The controller may be constituted by a single controller that performs centralized control, or by a plurality of controllers that perform individual processes of decentralized control in cooperation with one another.

Operation

The hydrogen compression operation (operation process) of the electrochemical hydrogen compression apparatus 100 according to the first embodiment will be described below with reference to FIG. 1.

The operation described below may be performed, for example, with the arithmetic circuit of the controller reading out the control program from the storage circuit of the controller. However, the following operation may be performed without using the controller in some cases. An operator may perform part or the whole of the operation.

First, a voltage is applied between the anode 12 and the cathode 11 of the MEA by the voltage applicator 13.

When hydrogen-containing gas is supplied to the MEA, hydrogen in the hydrogen-containing gas dissociates an electron at the anode 12 and becomes a proton ($H^+$) (Formula (1)). The dissociated electron drifts to the cathode 11 through the voltage applicator 13.

On the other hand, the proton passes through the proton-conducting electrolyte membrane 10 together with a water molecule and touches the cathode 11. At the cathode 11, a reduction reaction occurs between the proton having passes through the proton-conducting electrolyte membrane 10 and the electron, whereby hydrogen gas is generated (Formula (2)).

Here, a relational expression between each of a hydrogen-gas partial pressure at the anode 12 and a hydrogen-gas partial pressure at the cathode 11 and the voltage of the voltage applicator 13 is derived from the Nernst equation regarding the oxidation and reduction reaction. From the relational expression, it is easily understood that the hydrogen-gas partial pressure at the cathode 11 can be raised by increasing the voltage of the voltage applicator 13.

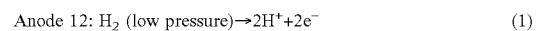

Anode 12: $H_2$ (low pressure)$\rightarrow 2H^+ + 2e^-$ (1)

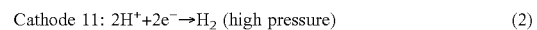

Cathode 11: $2H^+ + 2e^- \rightarrow H_2$ (high pressure) (2)

Thus, hydrogen gas is efficiently compressed at the cathode 11 of the electrochemical hydrogen compression apparatus 100.

As illustrated in FIG. 1, in addition to hydrogen gas ($H_2$), water ($H_2O$) also passes through the anode 12, the proton-conducting electrolyte membrane 10, and the cathode 11. However, the water is separated from the hydrogen gas using, for example, an appropriate water condensation trap (not illustrated).

Here, as illustrated in FIG. 1, the hydrogen gas compressed at the cathode 11 cross-leaks to the anode 12 through the proton-conducting electrolyte membrane 10. The hydrogen cross leak amount is generally in proportion to a difference in hydrogen-gas partial pressure between the cathode 11 and the anode 12, and in reverse proportion to a thickness of the proton-conducting electrolyte membrane 10. Furthermore, the hydrogen cross leak amount depends on the type of the proton-conducting electrolyte membrane 10, a humidified state and temperature of the MEA, and so on.

When the hydrogen gas pressure at the cathode 11 is raised from 0.1 MPa to 80 MPa, for example, the hydrogen gas in amount corresponding to several ten $mA/cm^2$ to several hundred $mA/cm^2$ cross-leaks. This implies that, when the hydrogen gas is compressed at 1 $A/cm^2$, the hydrogen returning from the cathode 11 to the anode 12 by the cross leak amounts to several % to several ten % of the hydrogen having drifted from the anode 12 to the cathode 11. The above-mentioned values of the hydrogen gas pressure and current density are merely illustrative, and they are not limited to the above examples.

Moreover, the amount of the hydrogen gas cross-leaking from the cathode 11 to the anode 12 increases, for example, with the progress of deterioration of the proton-conducting electrolyte membrane 10.

In consideration of the above point, in the electrochemical hydrogen compression apparatus 100 according to this embodiment, the hydrogen cross leak amount passing through the proton-conducting electrolyte membrane 10 is detected by the first detector 30 at appropriate timing. The hydrogen cross leak amount passing through the proton-conducting electrolyte membrane 10 may be detected by the first detector 30 when one of the numbers of times that the electrochemical hydrogen compression apparatus 100 is started up and stopped reaches a predetermined number.

As a result, the electrochemical hydrogen compression apparatus 100 according to this embodiment can more appropriately detect the hydrogen cross leak amount passing through the proton-conducting electrolyte membrane 10 than with the related-art techniques.

FIRST EXAMPLE

Figure 2:
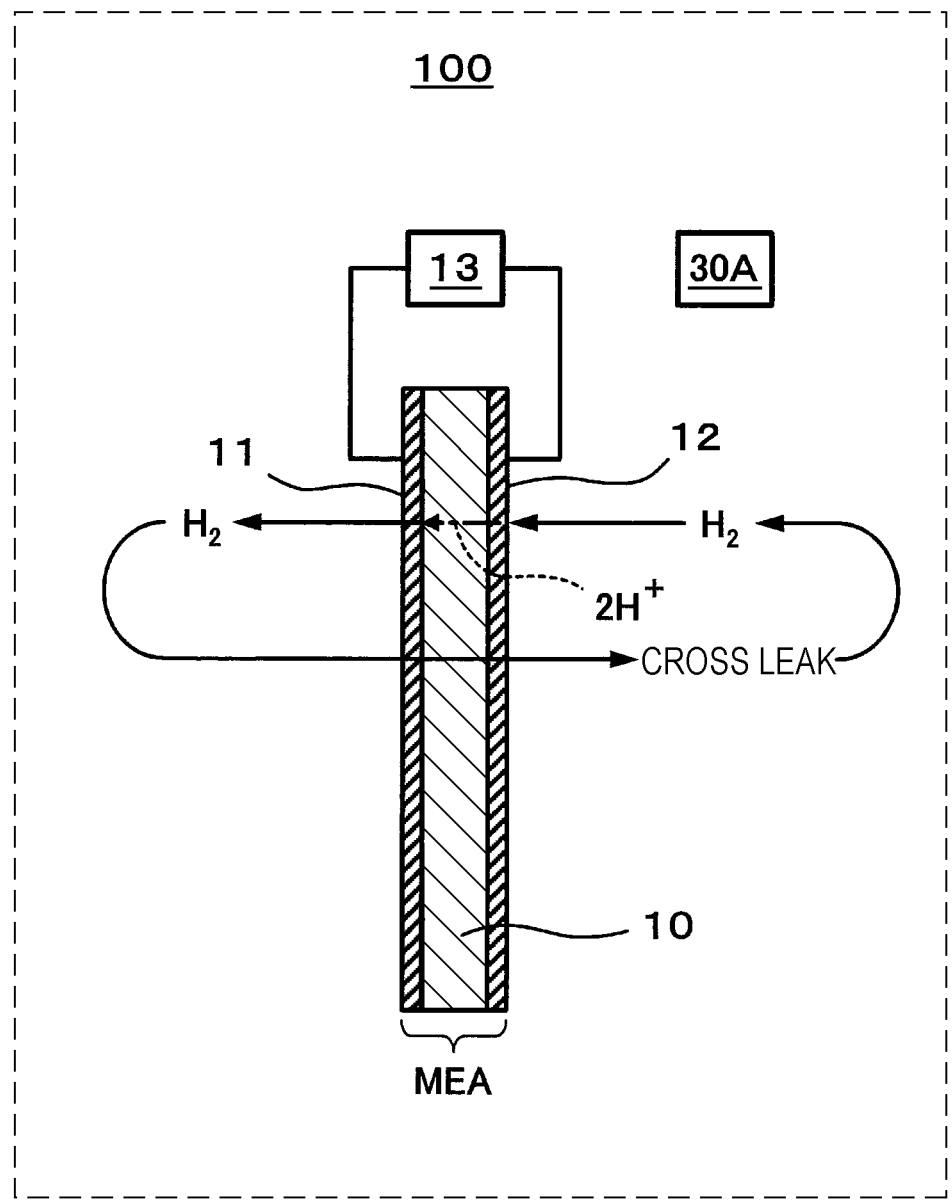
FIG. 2 illustrates one example of operation of an electrochemical hydrogen compression apparatus according to a first example of the first embodiment.
Figure 3:
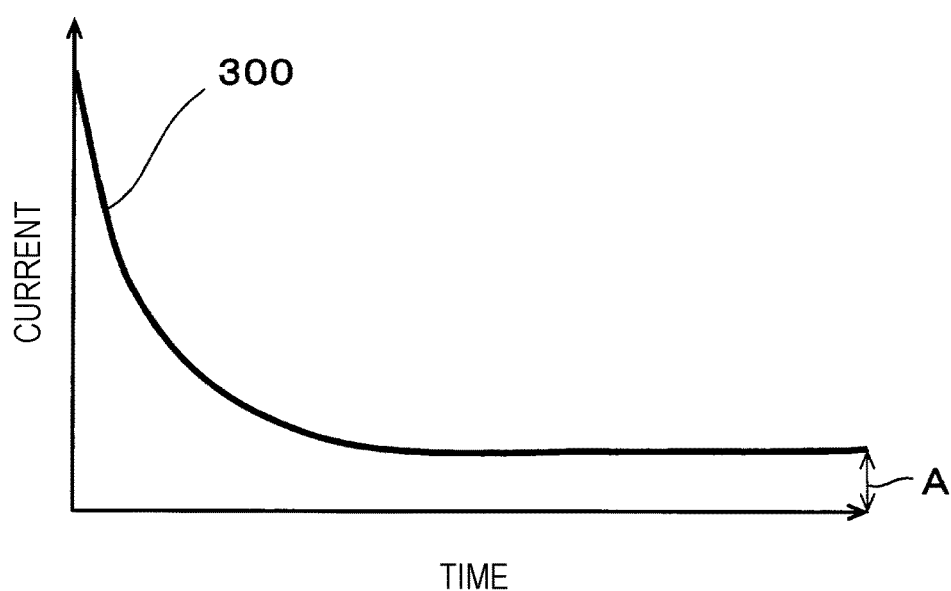
FIG. 3 is a graph depicting one example of the operation of the electrochemical hydrogen compression apparatus according to the first example of the first embodiment.

FIGS. 2 and 3 each illustrate one example of operation of an electrochemical hydrogen compression apparatus according to a first example of the first embodiment. The operation described below may be performed, for example, with the arithmetic circuit of the controller reading out the control program from the storage circuit of the controller. However, the following operation may be performed without using the controller in some cases. An operator may perform part or the whole of the operation.

As illustrated in FIG. 2, detection of the hydrogen cross leak amount by a first detector 30A in the electrochemical hydrogen compression apparatus 100 according to the first example is performed by applying a predetermined voltage to the MEA in a state where the anode 12 and the cathode 11 are both sealed off, and by measuring a current needed to return the hydrogen gas, which has cross-leaked from the cathode 11 of the MEA to the anode 12 of the MEA, to the cathode 11. Thus, in the electrochemical hydrogen compression apparatus 100 according to the first example, the first detector 30A detects the hydrogen cross leak amount from the current flowing between the anode 12 and the cathode 11 when the voltage is applied from the voltage applicator 13 in the state where the anode 12 and the cathode 11 are both sealed off. The first detector 30A may be of any suitable configuration insofar as it is able to detect the hydrogen cross leak amount from the above-mentioned current.

More specifically, by way of example, supply of hydrogen gas to the anode 12 is stopped in a state where a cathode chamber (not illustrated in FIG. 2) accommodating the cathode 11 is pressurized by hydrogen gas, and an anode chamber (not illustrated in FIG. 2) accommodating the anode 12 is sealed off on the outlet side. The anode chamber corresponds to a first flow path in the present disclosure. The cathode chamber corresponds to a second flow path in the present disclosure.

Then, a predetermined voltage (e.g., 0.4 V) is applied to the cathode 11. Such a voltage value is merely illustrative, and the applied voltage is not limited to that value. The hydrogen gas at the anode 12 drifts to the cathode 11 with the application of the voltage, whereby a current flows in proportion to an amount of the hydrogen gas drifting at that time.

As seen from a profile 300 in FIG. 3 representing change of the current, in an initial stage of the application of the voltage to the cathode 11, the current takes a high value because the hydrogen gas remaining at the anode 12 drifts to the cathode 11. In time, however, the current gradually approaches a value A that is just needed to return the hydrogen gas, which has cross-leaked from the cathode 11 to the anode 12, to the cathode 11.

Thus, the hydrogen cross leak amount can be detected by electrochemically detecting the above-mentioned current A that depends on the hydrogen cross leak amount.

Furthermore, change of the hydrogen cross leak amount depending on the number of stops of the compression operation of the electrochemical hydrogen compression apparatus 100 can be determined, for example, by measuring the above-mentioned current A at appropriate timing before each stop of the compression operation of the electrochemical hydrogen compression apparatus 100.

The features of the electrochemical hydrogen compression apparatus 100 according to the first example other than the above-described features may be similar to those of the electrochemical hydrogen compression apparatus 100 according to the first embodiment.

SECOND EXAMPLE

Figure 4:
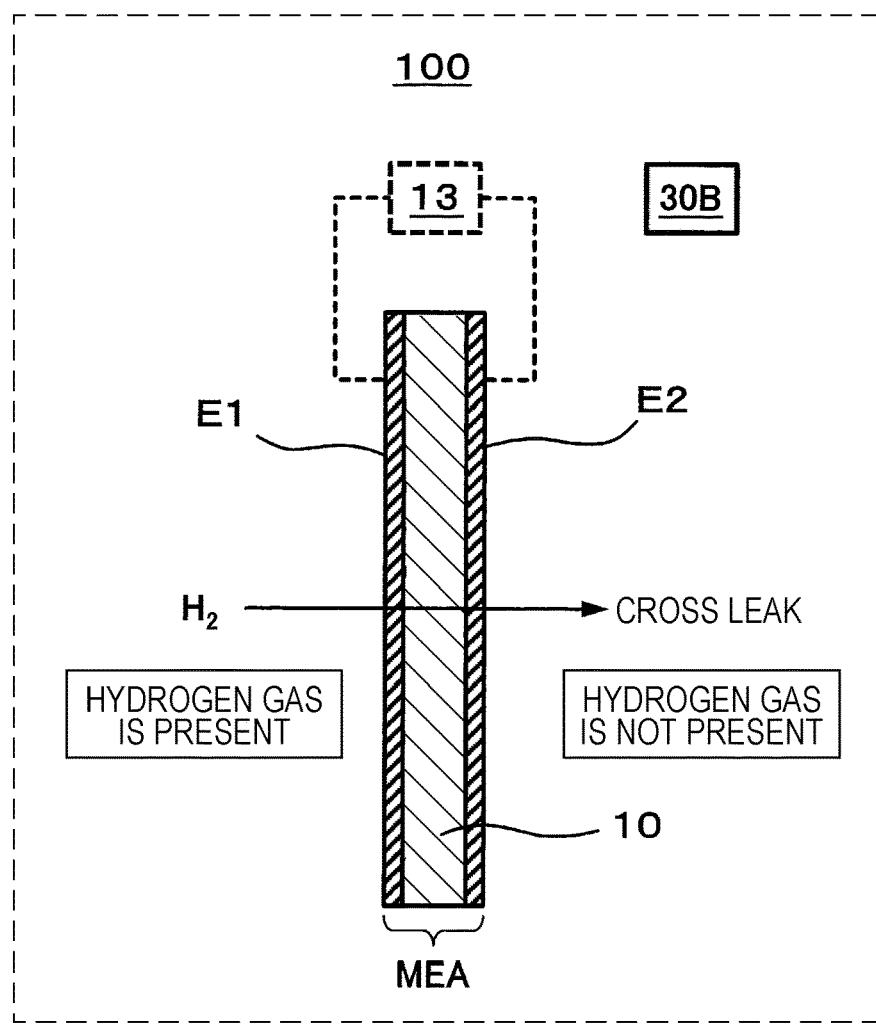
FIG. 4 illustrates one example of operation of an electrochemical hydrogen compression apparatus according to a second example of the first embodiment.
Figure 5:
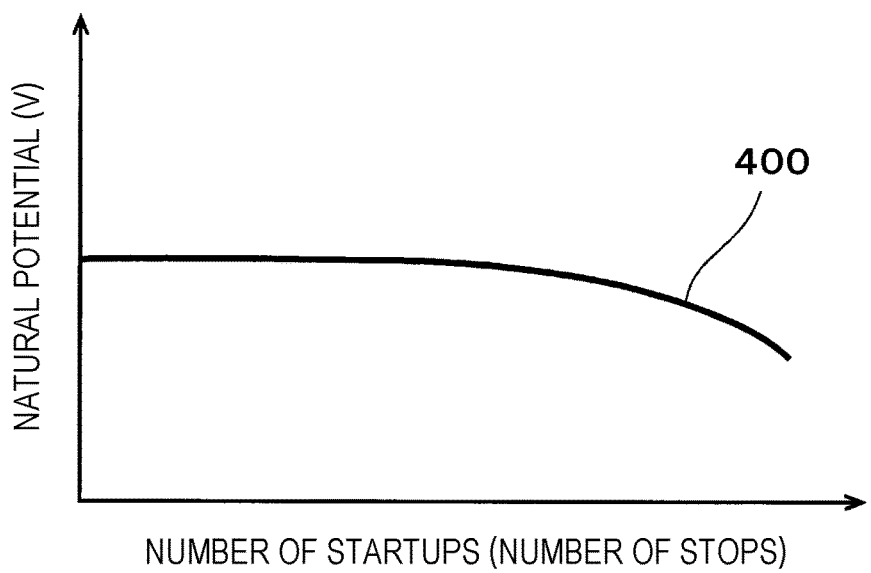
FIG. 5 is a graph depicting one example of the operation of the electrochemical hydrogen compression apparatus according to the second example of the first embodiment.

FIGS. 4 and 5 each illustrate one example of operation of an electrochemical hydrogen compression apparatus according to a second example of the first embodiment. The operation described below may be performed, for example, with the arithmetic circuit of the controller reading out the control program from the storage circuit of the controller. However, the following operation may be performed without using the controller in some cases. An operator may perform part or the whole of the operation.

As illustrated in FIG. 4, detection of the hydrogen cross leak amount by a first detector 30B in the electrochemical hydrogen compression apparatus 100 according to the second example is performed by bringing one electrode E1 of the MEA into a state filled with hydrogen gas and the other electrode E2 of the MEA into a state where hydrogen gas is not present, and by measuring a natural potential of the MEA in those states. The electrode E1 may be any one of an anode and a cathode. The electrode E2 is a cathode when the electrode E1 is the anode. The electrode E2 is an anode when the electrode E1 is the cathode. Thus, in the electrochemical hydrogen compression apparatus 100 according to the second example, the first detector 30B detects the hydrogen cross leak amount from the above-mentioned natural potential in the state where hydrogen gas is present at the one electrode E1 of the MEA and hydrogen gas is not present at the other electrode E2. The first detector 30B may be of any suitable configuration insofar as it is able to detect the hydrogen cross leak amount from the above-mentioned natural potential. The term "natural potential" stands for a potential of the MEA in an open state where the voltage applicator 13 is not connected to the MEA. Accordingly, in the second example, the application of the voltage to the MEA from the voltage applicator 13 is not performed as represented by a dotted line in FIG. 4.

More specifically, by way of example, in a state where a chamber (not illustrated in FIG. 4) accommodating the one electrode E1 is filled with hydrogen gas, a fluid (such as water vapor, nitrogen gas, or water) different from hydrogen is supplied to a chamber (not illustrated in FIG. 4) accommodating the other electrode E2, thereby bringing the other electrode E2 into a state filled with the supplied fluid. Then, the natural potential is measured after the lapse of a predetermined time (e.g., 1 hour) from the above operation. The above-mentioned types of the fluid and value of the predetermined time are merely illustrative, and they are not limited to those cases.

On that occasion, hydrogen gas cross-leaks from the one electrode E1 to the other electrode E2 due to a difference in hydrogen-gas partial pressure between the one electrode E1 and the other electrode E2. An amount of the hydrogen cross-leaking at that time appears as change of a natural potential V between the one electrode E1 and the other electrode E2 in accordance with the following Formula (3) that is derived from the Nernst equation.

$$V = RT/nF \times ln(P_{H2}(E1)/P_{H2}(E2)) \quad (3)$$

In the Formula (3), R denotes the gas constant, T denotes the temperature of the MEA, F denotes the Faraday constant, $P_{H2}(E1)$ denotes the hydrogen-gas partial pressure at the one electrode E1, and $P_{H2}(E2)$ denotes the hydrogen-gas partial pressure at the other electrode E2.

An operation of measuring the natural potential V is performed for each predetermined number of the compression operations of the electrochemical hydrogen compression apparatus 100. Because deterioration of the proton-conducting electrolyte membrane 10 progresses as the number of the compression operations of the electrochemical hydrogen compression apparatus 100 increases, a reduction amount of the natural potential V increases with an increase in the number of startups (or stops) of the electrochemical hydrogen compression apparatus 100. Accordingly, a profile 400 in FIG. 5 representing correlation between the number of startups (or stops) of the electrochemical hydrogen compression apparatus 100 and change of the natural potential V can be obtained by repeating the above-described measuring operation.

For example, in an initial stage where the number of startups of the electrochemical hydrogen compression apparatus 100 is small, the deterioration of the proton-conducting electrolyte membrane 10 is not progressed. In this case, therefore, the reduction amount of the natural potential V is small, as represented by the profile 400 in FIG. 5, even when a predetermined time (e.g., 1 hour) has lapsed after bringing the other electrode E2 into the state filled with the above-mentioned fluid while the one electrode E1 is brought into the state filled with the hydrogen gas.

On the other hand, in a stage where the number of startups of the electrochemical hydrogen compression apparatus 100 is large, the deterioration of the proton-conducting electrolyte membrane 10 is progressed. In that stage, therefore, a reduction of the natural potential V appears, as represented by the profile 400 in FIG. 5, with the lapse of a predetermined time (e.g., 1 hour) after bringing the other electrode E2 into the state filled with the above-mentioned fluid while the one electrode E1 is brought into the state filled with the hydrogen gas.

Thus, an amount of the change of the natural potential V represented by the profile 400 in FIG. 5 depends on both the progress of the deterioration of the proton-conducting electrolyte membrane 10 and the hydrogen cross leak amount.

As described above, the hydrogen cross leak amount can be detected by electrochemically detecting the natural potential V that depends on the hydrogen cross leak amount.

Furthermore, change of the hydrogen cross leak amount depending on the number of stops of the compression operation of the electrochemical hydrogen compression apparatus 100 can be determined, for example, by measuring the natural potential V at appropriate timing after each stop of the compression operation of the electrochemical hydrogen compression apparatus 100.

The features of the electrochemical hydrogen compression apparatus 100 according to the second example other than the above-described features may be similar to those of the electrochemical hydrogen compression apparatus 100 according to the first embodiment.

Second Embodiment

Taking into consideration the fact that the amount of hydrogen cross-leaking from the cathode 11 to the anode 12 increases with the progress of the deterioration of the proton-conducting electrolyte membrane 10 in the electrochemical hydrogen compression apparatus 100, the inventors have gained the conception of determining the progress of the deterioration of the proton-conducting electrolyte membrane 10 from the hydrogen cross leak amount.

Figure 6:
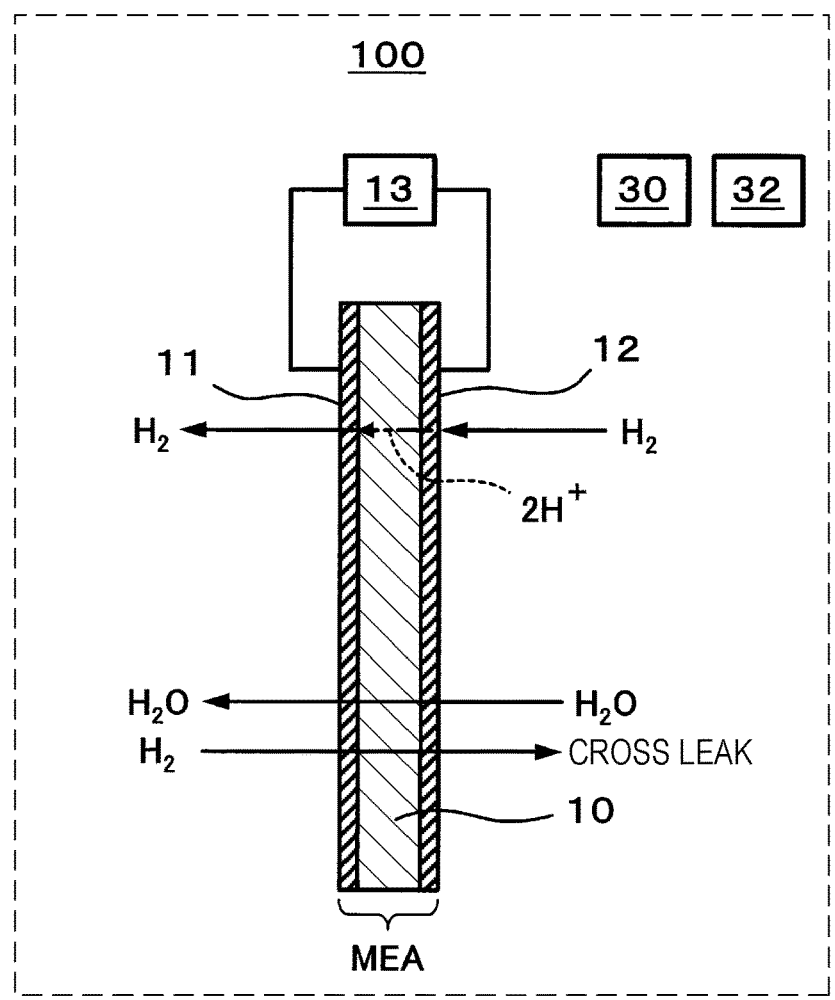
FIG. 6 illustrates one example of an electrochemical hydrogen compression apparatus according to a second embodiment.

FIG. 6 illustrates one example of an electrochemical hydrogen compression apparatus according to a second embodiment.

In the example illustrated in FIG. 6, the electrochemical hydrogen compression apparatus 100 includes a proton-conducting electrolyte membrane 10, a cathode 11, an anode 12, a voltage applicator 13, a first detector 30, and a determiner 32. The proton-conducting electrolyte membrane 10, the cathode 11, the anode 12, the voltage applicator 13, and the first detector 30 are similar to those in the first embodiment, and hence description of those components is omitted.

The determiner 32 determines that the progress of the deterioration of the proton-conducting electrolyte membrane 10 is advanced, when the hydrogen cross leak amount detected by the first detector 30 has increased with continuing use of the electrochemical hydrogen compression apparatus 100. Stated in another way, the electrochemical hydrogen compression apparatus 100 according to this embodiment includes the first detector 30 that detects the hydrogen cross leak amount passing through the proton-conducting electrolyte membrane 10, and specifies the progress of the deterioration of the proton-conducting electrolyte membrane 10 on the basis of an increase in the hydrogen cross leak amount passing through the proton-conducting electrolyte membrane 10. It can be determined, for example, that the progress of the deterioration of the proton-conducting electrolyte membrane 10 is advanced, when the amount of the hydrogen gas cross-leaking from the cathode 11 of the MEA to the anode 12 has started to increase significantly. Thus, the determiner 32 may determine that the progress of the deterioration of the proton-conducting electrolyte membrane 10 is advanced, when the hydrogen cross leak amount detected by the first detector 30 has exceeded a predetermined value. The determiner 32 may include, for example, an arithmetic circuit (not illustrated) and a storage circuit (not illustrated) that stores a determination program. Instead of employing the determiner 32, the controller (not illustrated in FIG. 6) may include a determination function unit corresponding to the determiner 32.

Furthermore, in the electrochemical hydrogen compression apparatus 100 according to this embodiment, the first detector 30 may detect the hydrogen cross leak amount at timing of at least one of the startup and the stop of the electrochemical hydrogen compression apparatus 100. In an example, the controller may control the first detector 30 to detect the hydrogen cross leak amount at timing of at least one of the startup and the stop of the electrochemical hydrogen compression apparatus 100.

Thus, the electrochemical hydrogen compression apparatus 100 according to this embodiment can appropriately determine the progress of the deterioration of the proton-conducting electrolyte membrane 10 by detecting the hydrogen cross leak amount passing through the proton-conducting electrolyte membrane 10 with the first detector 30.

Other features of the electrochemical hydrogen compression apparatus 100 according to the second embodiment than the above-described features may be similar to those of the electrochemical hydrogen compression apparatus 100 according to any of the first embodiment and the first and second examples of the first embodiment.

Third Embodiment

Apparatus Configuration

FIG. 7 illustrates one example of an electrochemical hydrogen compression apparatus according to a third embodiment.

In the example illustrated in FIG. 7, the electrochemical hydrogen compression apparatus 100 includes a proton-conducting electrolyte membrane 10, a cathode 11, an anode 12, a voltage applicator 13, an anode chamber 14, a cathode chamber 15, a first valve 16, a second valve 17, a third valve 18, a controller 20, a purger 23, and the first detector 30B. The anode chamber 14 corresponds to the first flow path in the present disclosure. The cathode chamber 15 corresponds to the second flow path in the present disclosure.

The proton-conducting electrolyte membrane 10, the cathode 11, the anode 12, the voltage applicator 13, and the first detector 30B are similar to those in the first embodiment, and hence description of those components is omitted.

The purger 23 is a device that purges hydrogen present at the other electrode of the MEA with a fluid different from hydrogen. The purger 23 may be of any suitable structure insofar as it is able to purge hydrogen present at the other electrode of the MEA with a fluid different from hydrogen. In the electrochemical hydrogen compression apparatus 100 according to this embodiment, the anode 12 is selected as the other electrode of the MEA by way of example. However, the cathode 11 may be selected as the other electrode of the MEA.

For example, nitrogen gas or water vapor can be used as the fluid different from hydrogen in the above-described purge operation by the purger 23, but the fluid usable in the purge operation is not limited to the above-mentioned types. In another example, water in the form of a liquid, or inert gas, such as rare gas, other than nitrogen gas may also be used as the fluid different from hydrogen.

A practical example of the purger 23 in the case of employing nitrogen gas as the purge gas will be described later in a first example of the third embodiment. A practical example of the purger 23 in the case of employing water vapor as the purge gas will be described later in a second example of the third embodiment.

The first valve 16 is disposed at an inlet of the anode chamber 14 accommodating the anode 12. More specifically, the first valve 16 is disposed in a hydrogen supply path 19 that extends from an inlet opening (not illustrated) of the anode chamber 14. Therefore, the inlet opening of the anode chamber 14 can be opened by opening the first valve 16. The inlet opening of the anode chamber 14 can be sealed off by closing the first valve 16. For example, an electromagnetic valve may be used as the first valve 16, but the first valve 16 is not limited to that type.

Hydrogen flowing through the hydrogen supply path 19 may be, for example, hydrogen gas ($H_2$) supplied from a hydrogen gas tank under a predetermined supply pressure, or hydrogen gas ($H_2$) supplied from a hydrogen gas infrastructure under a predetermined supply pressure.

The second valve 17 is disposed at an outlet of the cathode chamber 15 accommodating the cathode 11. More specifically, the second valve 17 is disposed in a path that extends from an outlet opening (not illustrated) of the cathode chamber 15. Therefore, the outlet opening of the cathode chamber 15 can be opened by opening the second valve 17. The outlet opening of the cathode chamber 15 can be sealed off by closing the second valve 17. For example, an electromagnetic valve may be used as the second valve 17, but the second valve 17 is not limited to that type.

The third valve 18 is disposed at an outlet of the anode chamber 14 accommodating the anode 12. More specifically, the third valve 18 is disposed in a path that extends from an outlet opening (not illustrated) of the anode chamber 14. Therefore, the outlet opening of the anode chamber 14 can be opened by opening the third valve 18. The outlet opening of the anode chamber 14 can be sealed off by closing the third valve 18. For example, an electromagnetic valve may be used as the third valve 18, but the third valve 18 is not limited to that type.

Here, the purger 23 is constituted such that, as denoted by a dotted line in FIG. 7, the above-mentioned fluid passes through the hydrogen supply path 19 between the inlet opening of the anode chamber 14 and the first valve 16 and then flows into the anode chamber 14.

When detecting the hydrogen cross leak amount by the first detector 30B, the controller 20 operates the purger 23 to purge the hydrogen, which is present at the other electrode of the MEA, with the above-mentioned fluid. In other words, the controller 20 closes the first valve 16, opens the third valve 18, and operates the purger 23 to form a state where hydrogen is present at one electrode (cathode 11 in this embodiment) of the MEA and hydrogen is not present at the other electrode (anode 12 in this embodiment) of the MEA.

The controller 20 may be of any suitable configuration insofar as it has the control function. The controller 20 may include, for example, an arithmetic circuit (not illustrated) and a storage circuit (not illustrated) that stores a control program. The arithmetic circuit may be, for example, an MPU or a CPU. The storage circuit may be, for example, a memory. The controller 20 may be constituted by a single controller that performs centralized control, or by a plurality of controllers that perform individual processes of decentralized control in cooperation with one another.

Other features of the electrochemical hydrogen compression apparatus 100 according to the third embodiment than the above-described features may be similar to those of the electrochemical hydrogen compression apparatus 100 according to any of the first embodiment, the first and second examples of the first embodiment, and the second embodiment.

Operation

Detection of the hydrogen cross leak amount by the first detector 30B in the electrochemical hydrogen compression apparatus 100 according to the third embodiment will be described below with reference to FIG. 7.

The operation described below may be performed, for example, with the arithmetic circuit of the controller 20 reading out the control program from the storage circuit of the controller 20. However, the following operation may be performed without using the controller 20 in some cases. An operator may perform part or the whole of the operation.

The detection of the hydrogen cross leak amount by the first detector 30B in the electrochemical hydrogen compression apparatus 100 is performed by measuring the natural potential of the MEA on condition that, as described above, the one electrode of the MEA is brought into the state filled with hydrogen gas and the other electrode of the MEA is brought into the state where hydrogen gas is not present.

To start the detection, the hydrogen compression operation (operation process) of the electrochemical hydrogen compression apparatus 100 is first stopped.

Then, the first valve 16 is closed, the third valve 18 is opened, and the purger 23 is operated. At that time, the second valve 17 may be closed. In this state, the fluid supplied from the purger 23 flows into the anode chamber 14 from the inlet opening of the anode chamber 14 through the hydrogen supply path 19, and is then discharged to the outside from the outlet opening of the anode chamber 14. As a result, the hydrogen present in the anode chamber 14 is purged out with the above-mentioned fluid. In other words, the hydrogen gas present in the anode chamber 14 is discharged to the outside from the outlet opening of the anode chamber 14 with a flow of the above-mentioned fluid.

After the above-described purge operation by the purger 23 has been completed, the operation of the purger 23 is stopped and the third valve 18 is closed.

The above-described purge operation forms the state where hydrogen is present at the one electrode (cathode 11 in this embodiment) of the MEA and hydrogen is not present at the other electrode (anode 12 in this embodiment) of the MEA.

A method of detecting the hydrogen cross leak amount subsequent to the purge operation is similar to that in the second example of the first embodiment, and hence description of the method is omitted.

Other features in the operation of the electrochemical hydrogen compression apparatus 100 according to the third embodiment than the above-described features may be similar to those of the electrochemical hydrogen compression apparatus 100 according to any of the first embodiment, the first and second examples of the first embodiment, and the second embodiment.

Thus, the electrochemical hydrogen compression apparatus 100 according to the third embodiment can easily form the state where hydrogen is not present at the other electrode, by operating the purger 23 to purge the hydrogen, which is present at the other electrode of the MEA, with the fluid different from hydrogen. As a result, in comparison with the case of not including the purger 23, the hydrogen cross leak amount can be more appropriately detected from the natural potential of the one electrode of the MEA under a condition in the state where hydrogen is present at the one electrode of the MEA and hydrogen is not present at the other electrode of the MEA.

FIRST EXAMPLE

Figure 8A:
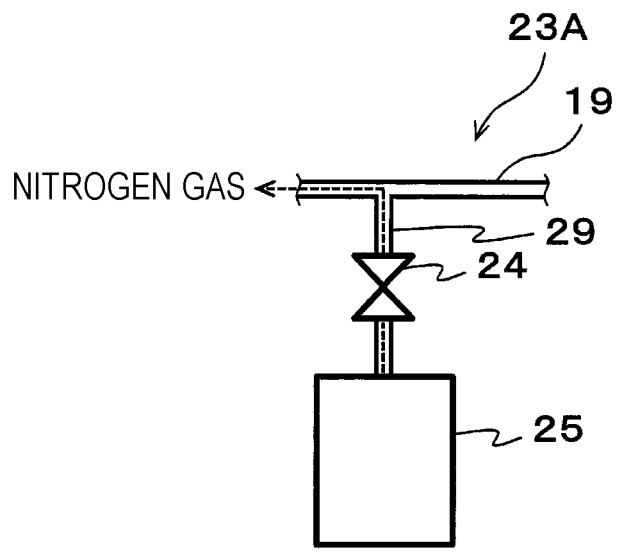
FIG. 8A illustrates one example of a purger in an electrochemical hydrogen compression apparatus according to a first example of the third embodiment.

FIG. 8A illustrates one example of a purger in an electrochemical hydrogen compression apparatus according to a first example of the third embodiment.

In the example illustrated in FIG. 8A, a purger 23A includes a high-pressure gas tank 25 and a fourth valve 24. More specifically, the fourth valve 24 is disposed in a branch path 29 that is branched from the hydrogen supply path 19 at a position downstream of the first valve 16 (see FIG. 7). An extended end of the branch path 29 is connected to the high-pressure gas tank 25.

In the purger 23A according to this example, nitrogen gas in a high-pressure state is filled in the high-pressure gas tank 25. For example, an electromagnetic valve may be used as the fourth valve 24, but the fourth valve 24 is not limited to that type.

When detecting the hydrogen cross leak amount by the first detector 30B, the controller 20 opens the fourth valve 24 of the purger 23A to purge the hydrogen, which is present at the other electrode of the MEA, with the above-mentioned nitrogen gas. In other words, the controller 20 closes the first valve 16 (see FIG. 7), opens the third valve 18 (see FIG. 7), and opens the fourth valve 24 of the purger 23A to form the state where hydrogen is present at one electrode (cathode 11 in this example) of the MEA and hydrogen is not present at the other electrode (anode 12 in this example) of the MEA. In this state, the nitrogen gas supplied from the purger 23A flows into the anode chamber 14 from the inlet opening of the anode chamber 14 through the branch path 29 and the hydrogen supply path 19, and is then discharged to the outside from the outlet opening of the anode chamber 14. As a result, the hydrogen present in the anode chamber 14 is purged out with the above-mentioned nitrogen gas.

After the above-described purge operation by the purger 23A has been completed, the fourth valve 24 and the third valve 18 of the purger 23A are closed. Subsequently, the detection of the hydrogen cross leak amount by the first detector 30B is performed as per described above.

The features of the electrochemical hydrogen compression apparatus 100 according to the this example other than the above-described features may be similar to those of the electrochemical hydrogen compression apparatus 100 according to the third embodiment.

SECOND EXAMPLE

Figure 8B:
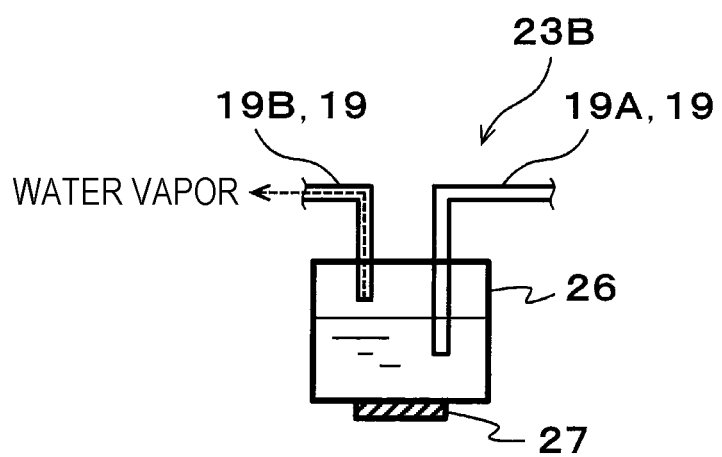
FIG. 8B illustrates one example of a purger in an electrochemical hydrogen compression apparatus according to a second example of the third embodiment.

FIG. 8B illustrates one example of a purger in an electrochemical hydrogen compression apparatus according to a second example of the third embodiment.

In the example illustrated in FIG. 8B, a purger 23B includes a bubbling tank 26 and a heater 27.

In the electrochemical hydrogen compression apparatus 100, hydrogen gas flowing through the hydrogen supply path 19 is often humidified with a bubbling technique. In such a case, the hydrogen supply path 19 includes, for example, a first pipe 19A that extends from the first valve 16 (see FIG. 7) to penetrate through an upper wall portion of the bubbling tank 26 in an air-tight fashion and to reach a position in water, and a second pipe 19B that extends from an appropriate position in an upper space within the bubbling tank 26 to penetrate through the upper wall portion of the bubbling tank 26 in an air-tight fashion and to reach the inlet opening of the anode chamber 14. In other words, hydrogen gas is humidified with bubbling that is caused by supplying the hydrogen gas, after having passed through the first pipe 19A, into the water in the bubbling tank 26.

Other devices needed to humidify the hydrogen gas with the bubbling technique are also disposed as appropriate. There are disposed, for example, a warming heater that heats the water in the bubbling tank 26 up to a temperature suitable for humidification of the hydrogen gas, and a temperature sensor that detects a temperature of the water in the bubbling tank 26.

The above-mentioned devices are merely illustrative, and the other devices are not limited to those examples.

In the electrochemical hydrogen compression apparatus 100 according to this example, when the hydrogen cross leak amount is detected by the first detector 30B, the above-described humidifier of the bubbling type further functions as the purger 23B for purging the hydrogen, which is present at the other electrode of the MEA, with the water vapor different from hydrogen. More specifically, the heater 27 is disposed at a wall portion of the bubbling tank 26, and the water in the bubbling tank 26 is evaporated by heat applied from the heater 27. Thus, an appropriate amount of water vapor can be delivered into the second pipe 19B. The heater 27 may be the above-mentioned warming heater to humidify the hydrogen gas, but the heater 27 is not limited to such an example.

When detecting the hydrogen cross leak amount by the first detector 30B, the controller 20 operates the heater 27 of the purger 23B to purge the hydrogen, which is present at the other electrode of the MEA, with the above-described water vapor. More specifically, the controller 20 closes the first valve 16 (see FIG. 7), opens the third valve 18 (see FIG. 7), and operates the heater 27 of the purger 23B to form the state where hydrogen is present at one electrode (cathode 11 in this example) of the MEA and hydrogen is not present at the other electrode (anode 12 in this example) of the MEA. In this state, the water vapor supplied from the purger 23B flows into the anode chamber 14 from the inlet opening of the anode chamber 14 through the second pipe 19B, and is then discharged to the outside from the outlet opening of the anode chamber 14. As a result, the hydrogen present in the anode chamber 14 is purged out with the above-mentioned water vapor.

After the above-described purge operation by the purger 23B has been completed, the operation of the heater 27 of the purger 23B is stopped, and the third valve 18 is closed. Subsequently, the detection of the hydrogen cross leak amount by the first detector 30B is performed as per described above.

The features of the electrochemical hydrogen compression apparatus 100 according to the this example other than the above-described features may be similar to those of the electrochemical hydrogen compression apparatus 100 according to the third embodiment.

Fourth Embodiment

Apparatus Configuration

FIG. 9 illustrates one example of an electrochemical hydrogen compression apparatus according to a fourth embodiment.

In the example illustrated in FIG. 9, the electrochemical hydrogen compression apparatus 100 includes a proton-conducting electrolyte membrane 10, a cathode 11, an anode 12, a voltage applicator 13, an anode chamber 14, a cathode chamber 15, a first valve 16, a second valve 17, a controller 20, and a first detector 30A.

The proton-conducting electrolyte membrane 10, the cathode 11, the anode 12, the voltage applicator 13, and the first detector 30A are similar to those in the first embodiment, and hence description of those components is omitted. Moreover, the anode chamber 14, the cathode chamber 15, the first valve 16, and the second valve 17 are similar to those in the third embodiment, and hence description of those components is omitted.

In the electrochemical hydrogen compression apparatus 100 according to this embodiment, there is no outlet opening of the anode chamber 14; namely, an outlet of the anode chamber 14 is sealed off.

The controller 20 controls the first valve 16 and the second valve 17. More specifically, when detecting the hydrogen cross leak amount by the first detector 30A, the controller 20 closes the first valve 16 and the second valve 17, thereby bringing each of the anode 12 and the cathode 11 into a sealed-off state.

The controller 20 may be of any suitable configuration insofar as it has the control function. The controller 20 may include, for example, an arithmetic circuit (not illustrated) and a storage circuit (not illustrated) that stores a control program. The arithmetic circuit may be, for example, an MPU or a CPU. The storage circuit may be, for example, a memory. The controller 20 may be constituted by a single controller that performs centralized control, or by a plurality of controllers that perform individual processes of decentralized control in cooperation with one another.

Other features of the electrochemical hydrogen compression apparatus 100 according to the fourth embodiment than the above-described features may be similar to those of the electrochemical hydrogen compression apparatus 100 according to any of the first embodiment, the first and second examples of the first embodiment, the second embodiment, the third embodiment, and the first and second examples of the third embodiment.

Operation

Detection of the hydrogen cross leak amount by the first detector 30A in the electrochemical hydrogen compression apparatus 100 according to the fourth embodiment will be described below with reference to FIG. 9.

The operation described below may be performed, for example, with the arithmetic circuit of the controller 20 reading out the control program from the storage circuit of the controller 20. However, the following operation may be performed without using the controller 20 in some cases. An operator may perform part or the whole of the operation.

The detection of the hydrogen cross leak amount by the first detector 30A in the electrochemical hydrogen compression apparatus 100 is performed, as described above, by applying a predetermined voltage to the MEA in the state where the anode 12 and the cathode 11 are both sealed off, and by measuring a current needed to return the hydrogen gas, which has cross-leaked from the cathode 11 of the MEA to the anode 12 of the MEA, to the cathode 11.

To start the detection, the hydrogen compression operation (operation process) of the electrochemical hydrogen compression apparatus 100 is first stopped.

Then, the first valve 16 and the second valve 17 are closed. The state where the anode 12 and the cathode 11 are both sealed off is formed by closing those valves.

A subsequently-performed method of detecting the hydrogen cross leak amount is similar to that in the first example of the first embodiment, and hence description of the method is omitted.

Other features in the operation of the electrochemical hydrogen compression apparatus 100 according to the fourth embodiment than the above-described features may be similar to those of the electrochemical hydrogen compression apparatus 100 according to any of the first embodiment, the first and second examples of the first embodiment, the second embodiment, the third embodiment, and the first and second examples of the third embodiment.

Thus, the electrochemical hydrogen compression apparatus 100 according to the fourth embodiment can easily form the state where the anode 12 and the cathode 11 are both sealed off, by closing the first valve 16 and the second valve 17 at appropriate timing. As a result, in comparison with the case of not including the first valve 16 and the second valve 17, the hydrogen cross leak amount can be more appropriately detected from the current flowing between the anode 12 and the cathode 11 when the voltage is applied from the voltage applicator 13 in the state where the anode 12 and the cathode 11 are both sealed off.

Modification

FIG. 10 illustrates one example of an electrochemical hydrogen compression apparatus according to a modification of the fourth embodiment.

In the example illustrated in FIG. 10, the electrochemical hydrogen compression apparatus 100 includes a proton-conducting electrolyte membrane 10, a cathode 11, an anode 12, a voltage applicator 13, an anode chamber 14, a cathode chamber 15, a first valve 16, a second valve 17, a third valve 18, a controller 20, and a first detector 30A.

The proton-conducting electrolyte membrane 10, the cathode 11, the anode 12, the voltage applicator 13, and the first detector 30A are similar to those in the first embodiment, and hence description of those components is omitted. Moreover, the anode chamber 14, the cathode chamber 15, the first valve 16, the second valve 17, and the third valve 18 are similar to those in the third embodiment, and hence description of those components is omitted.

The controller 20 controls the first valve 16, the second valve 17, and the third valve 18. More specifically, when detecting the hydrogen cross leak amount by the first detector 30A, the controller 20 closes the first valve 16, the second valve 17, and the third valve 18, thereby bringing each of the anode 12 and the cathode 11 into a sealed-off state.

Detection of the hydrogen cross leak amount by the first detector 30A in the electrochemical hydrogen compression apparatus 100 is performed, as described above, by applying a predetermined voltage to the MEA in the state where the anode 12 and the cathode 11 are both sealed off, and by measuring a current needed to return the hydrogen gas, which has cross-leaked from the cathode 11 of the MEA to the anode 12 of the MEA, to the cathode 11.

To start the detection, the hydrogen compression operation (operation process) of the electrochemical hydrogen compression apparatus 100 is first stopped.

Then, the first valve 16, the second valve 17, and the third valve 18 are closed. The state where the anode 12 and the cathode 11 are both sealed off is formed by closing those valves.

A subsequently-performed method of detecting the hydrogen cross leak amount is similar to that in the first example of the first embodiment, and hence description of the method is omitted.

Thus, the electrochemical hydrogen compression apparatus 100 according to this modification can easily form the state where the anode 12 and the cathode 11 are both sealed off, by closing the first valve 16, the second valve 17, and the third valve 18 at appropriate timing. As a result, in comparison with the case of not including the first valve 16, the second valve 17, and the third valve 18, the hydrogen cross leak amount can be more appropriately detected from the current flowing between the anode 12 and the cathode 11 when the voltage is applied from the voltage applicator 13 in the state where the anode 12 and the cathode 11 are both sealed off.

Other features of the electrochemical hydrogen compression apparatus 100 according to this modification than the above-described features may be similar to those of the electrochemical hydrogen compression apparatus 100 according to the fourth embodiment.

Fifth Embodiment

Figure 11:
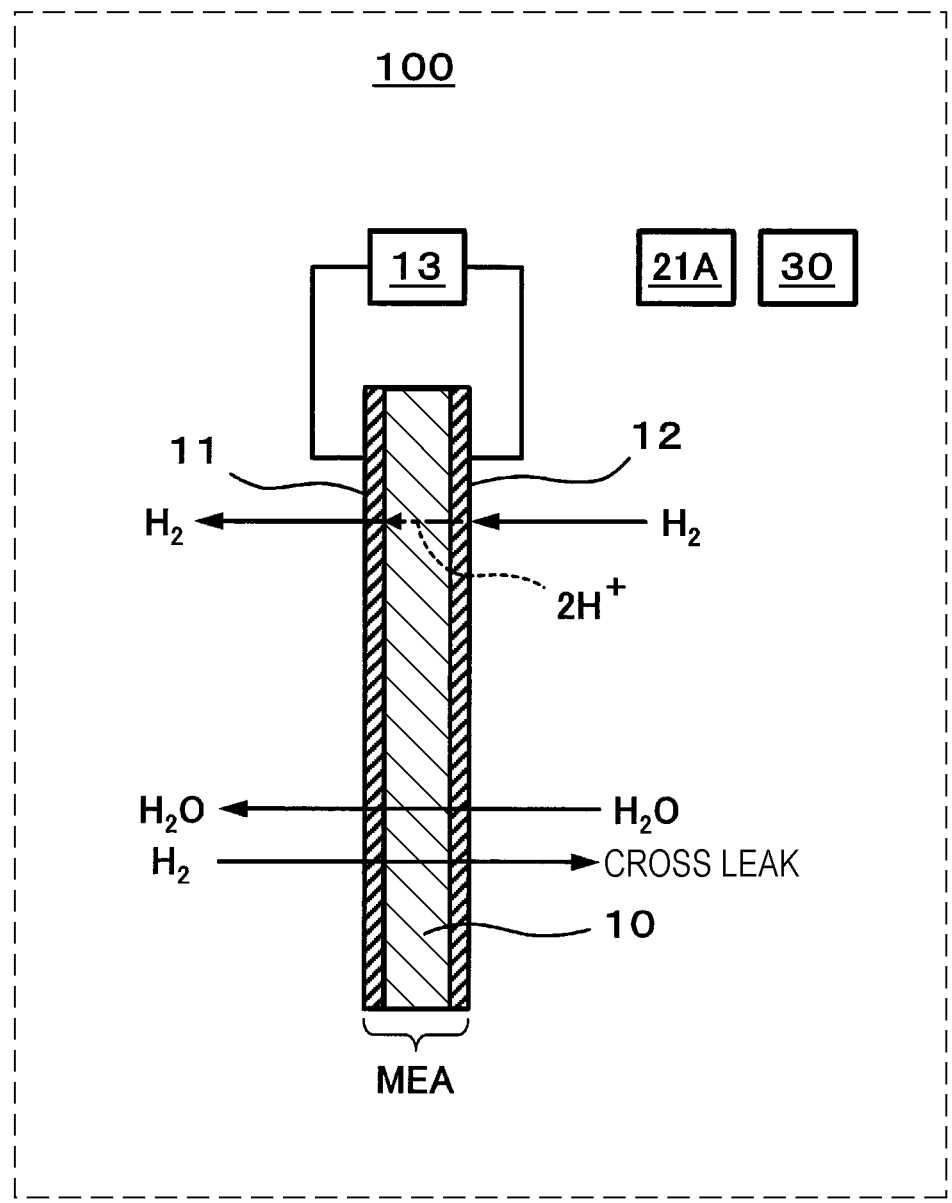
FIG. 11 illustrates one example of an electrochemical hydrogen compression apparatus according to a fifth embodiment.

FIG. 11 illustrates one example of an electrochemical hydrogen compression apparatus according to a fifth embodiment.

In the example illustrated in FIG. 11, the electrochemical hydrogen compression apparatus 100 includes a proton-conducting electrolyte membrane 10, a cathode 11, an anode 12, a voltage applicator 13, a first detector 30, and an annunciator 21A.

The proton-conducting electrolyte membrane 10, the cathode 11, the anode 12, the voltage applicator 13, and the first detector 30 are similar to those in the first embodiment, and hence description of those components is omitted.

The annunciator 21A is a device that issues information denoting an increase in the hydrogen cross leak amount when the hydrogen cross leak amount detected by the first detector 30 has increased. The annunciator 21A may be of any suitable configuration insofar as it is able to issue that kind of information.

For example, a display screen of a control panel (not illustrated) may be used as the annunciator 21A. In this case, an operator of the electrochemical hydrogen compression apparatus 100 can recognize the increase in the hydrogen cross leak amount from information indicated on the display screen of the control panel.

Alternatively, a light emitter or a sound producer (not illustrated) may also be used as the annunciator 21A. In this case, the operator can recognize the increase in the hydrogen cross leak amount from light information emitted from the light emitter or sound information issued from the sound producer.

Furthermore, a communication unit (not illustrated) may be used as the annunciator 21A. In this case, an operator or a maintenance worker of the electrochemical hydrogen compression apparatus 100 can recognize the increase in the hydrogen cross leak amount from information sent from the communication unit in a wireless or wired manner.

A controller (not illustrated in FIG. 11) may control the operation of the annunciator 21A. By way of example, when the controller determines that the hydrogen cross leak amount has increased, the controller may control the annunciator 21A to issue the information denoting the increase in the hydrogen cross leak amount.

Thus, in comparison with the case of not including the annunciator 21A, the electrochemical hydrogen compression apparatus 100 according to the fifth embodiment makes it possible to recognize the increase in the hydrogen cross leak amount passing through the proton-conducting electrolyte membrane at more appropriate timing.

Other features of the electrochemical hydrogen compression apparatus 100 according to the fifth embodiment than the above-described features may be similar to those of the electrochemical hydrogen compression apparatus 100 according to any of the first embodiment, the first and second examples of the first embodiment, the second embodiment, the third embodiment, the first and second examples of the third embodiment, the fourth embodiment, and the modification of the fourth embodiment.

Sixth Embodiment

Taking into consideration the fact that the amount of hydrogen cross-leaking from the cathode 11 to the anode 12 increases with the progress of the deterioration of the proton-conducting electrolyte membrane 10 in the electrochemical hydrogen compression apparatus 100, the inventors have gained the conception of issuing information denoting the progress of the deterioration of the proton-conducting electrolyte membrane 10. Furthermore, the inventors have found that stable hydrogen compression operation of the electrochemical hydrogen compression apparatus 100 can be ensured by issuing the information denoting the progress of the deterioration of the proton-conducting electrolyte membrane 10.

Figure 12:
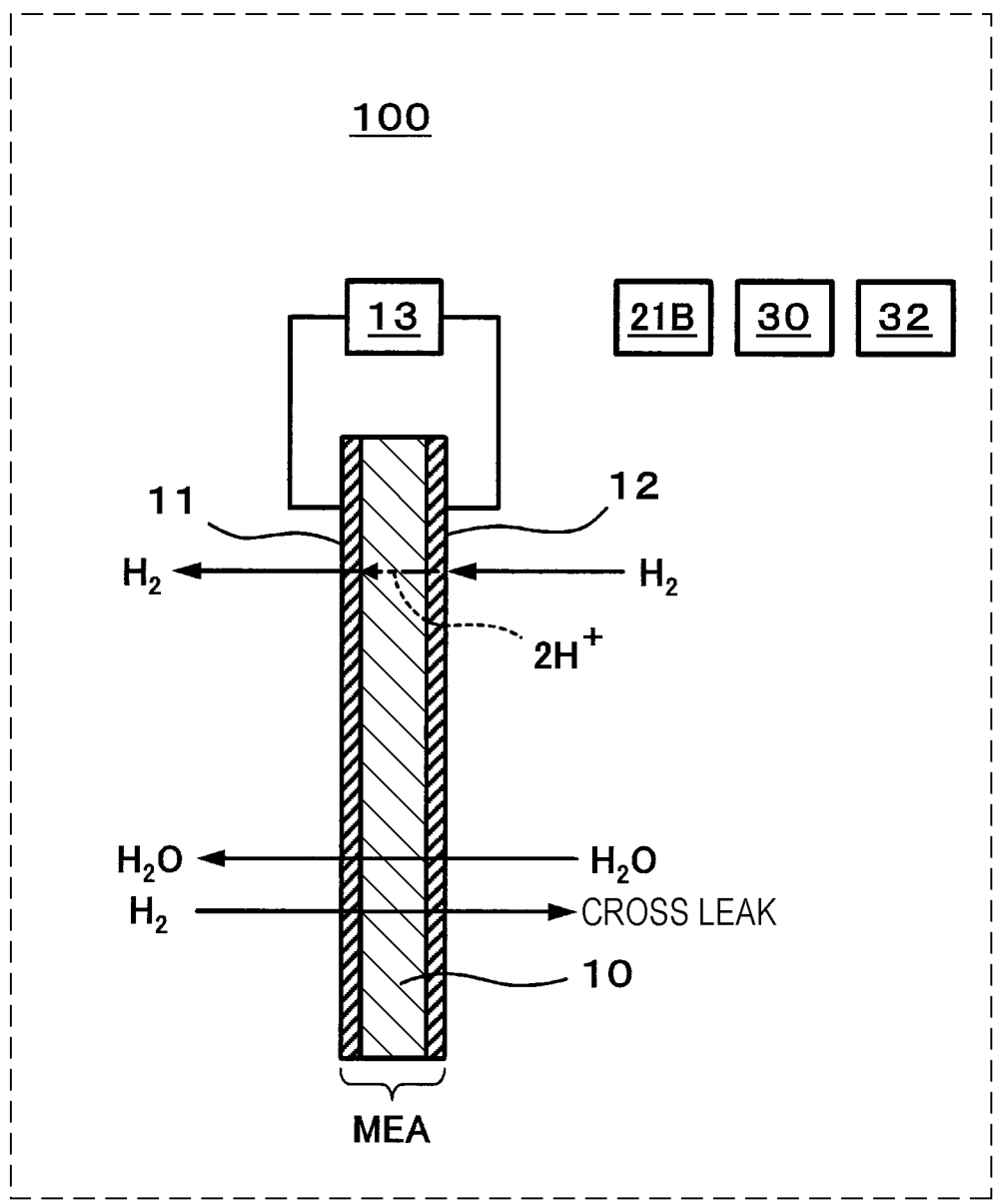
FIG. 12 illustrates one example of an electrochemical hydrogen compression apparatus according to a sixth embodiment.

FIG. 12 illustrates one example of an electrochemical hydrogen compression apparatus according to a sixth embodiment.

In the example illustrated in FIG. 12, the electrochemical hydrogen compression apparatus 100 includes a proton-conducting electrolyte membrane 10, a cathode 11, an anode 12, a voltage applicator 13, a first detector 30, an annunciator 21B, and a determiner 32.

The proton-conducting electrolyte membrane 10, the cathode 11, the anode 12, the voltage applicator 13, and the first detector 30 are similar to those in the first embodiment, and hence description of those components is omitted. Moreover, the determiner 32 is similar to that in the second embodiment, and hence description of the determiner 32 is omitted.

The annunciator 21B is a device that issues information denoting the progress of the deterioration of the proton-conducting electrolyte membrane 10 as being advanced when the determiner 32 determines that the deterioration of the proton-conducting electrolyte membrane 10 has progressed.

Thus, taking into consideration the fact that the amount of hydrogen gas cross-leaking from the cathode 11 to the anode 12 increases with the progress of the deterioration of the proton-conducting electrolyte membrane 10, the electrochemical hydrogen compression apparatus 100 according to the sixth embodiment is constituted to issue the information denoting the progress of the deterioration of the proton-conducting electrolyte membrane 10 as being advanced with the annunciator 21B when the determiner 32 determines that the deterioration of the proton-conducting electrolyte membrane 10 has progressed.

As in the case of the annunciator 21A, for example, a display screen of a control panel, a light emitter, a sound producer, or a communication unit may be used as the annunciator 21B.

A controller (not illustrated in FIG. 12) may control the operation of the annunciator 21B. By way of example, in accordance with the determination, made by the determiner 32, as to the deterioration of the proton-conducting electrolyte membrane 10, the controller may control the annunciator 21B to issue, to the outside, the information denoting the progress of the deterioration of the proton-conducting electrolyte membrane 10 as being advanced.

Thus, in comparison with the case of not including the annunciator 21B, the electrochemical hydrogen compression apparatus 100 according to the sixth embodiment makes it possible to recognize the progress of the deterioration of the proton-conducting electrolyte membrane 10 at more appropriate timing unlike the related art. In other words, the stable hydrogen compression operation of the electrochemical hydrogen compression apparatus 100 can be ensured by issuing the information denoting the progress of the deterioration of the proton-conducting electrolyte membrane 10.

By way of example, when the amount of the hydrogen gas cross-leaking from the cathode 11 to the anode 12 increases with the progress of the deterioration of the proton-conducting electrolyte membrane 10, compression efficiency of the electrochemical hydrogen compression apparatus 100 reduces. However, the electrochemical hydrogen compression apparatus 100 according to the sixth embodiment can appropriately cope with such a problem by issuing the information as described above. In addition, when the progress of the deterioration of the proton-conducting electrolyte membrane 10 is advanced, there is a possibility that the proton-conducting electrolyte membrane 10 may be damaged and the electrochemical hydrogen compression apparatus 100 may be failed. However, the electrochemical hydrogen compression apparatus 100 according to the sixth embodiment can reduce such a possibility by issuing the information as described above.

Other features of the electrochemical hydrogen compression apparatus 100 according to the sixth embodiment than the above-described features may be similar to those of the electrochemical hydrogen compression apparatus 100 according to the second embodiment.

Seventh Embodiment

As a result of intensively studying estimation on the deterioration of the proton-conducting electrolyte membrane 10, the inventors have gained the finding as follows.

With repetition of cycles of humidifying and drying the proton-conducting electrolyte membrane 10, the proton-conducting electrolyte membrane 10 deteriorates, and gas barrier properties of the proton-conducting electrolyte membrane 10 degrade.

Here, during a period under hydrogen compression at the cathode 11, the proton-conducting electrolyte membrane 10 is in a relatively humidified state as compared with a period under high-pressure hydrogen release at the cathode 11. During a period under high-pressure hydrogen release at the cathode 11, the proton-conducting electrolyte membrane 10 is in a relatively dried state as compared with the period under the hydrogen compression at the cathode 11.

Taking into consideration the above point, the inventors have found that the deterioration of the proton-conducting electrolyte membrane 10 can be estimated from at least one of the number of hydrogen compressions at the cathode 11 and the number of high-pressure hydrogen releases at the cathode 11.

During the period under the hydrogen compression at the cathode 11, the proton-conducting electrolyte membrane 10 is pressed against the anode 12 away from the cathode 11 due to a difference between a hydrogen-gas partial pressure at the cathode 12 and a hydrogen-gas partial pressure at the anode 12. Thus, in such a situation, because mechanical stress is applied to the proton-conducting electrolyte membrane 10 and deformation, etc. of the proton-conducting electrolyte membrane 10 is caused, there may be a possibility that the hydrogen cross leak is more apt to occur.

Accordingly, it can be regarded that the number of hydrogen compressions at the cathode 11 and the number of high-pressure hydrogen releases at the cathode 11 are closely related to the deterioration of the proton-conducting electrolyte membrane 10.

Figure 13:
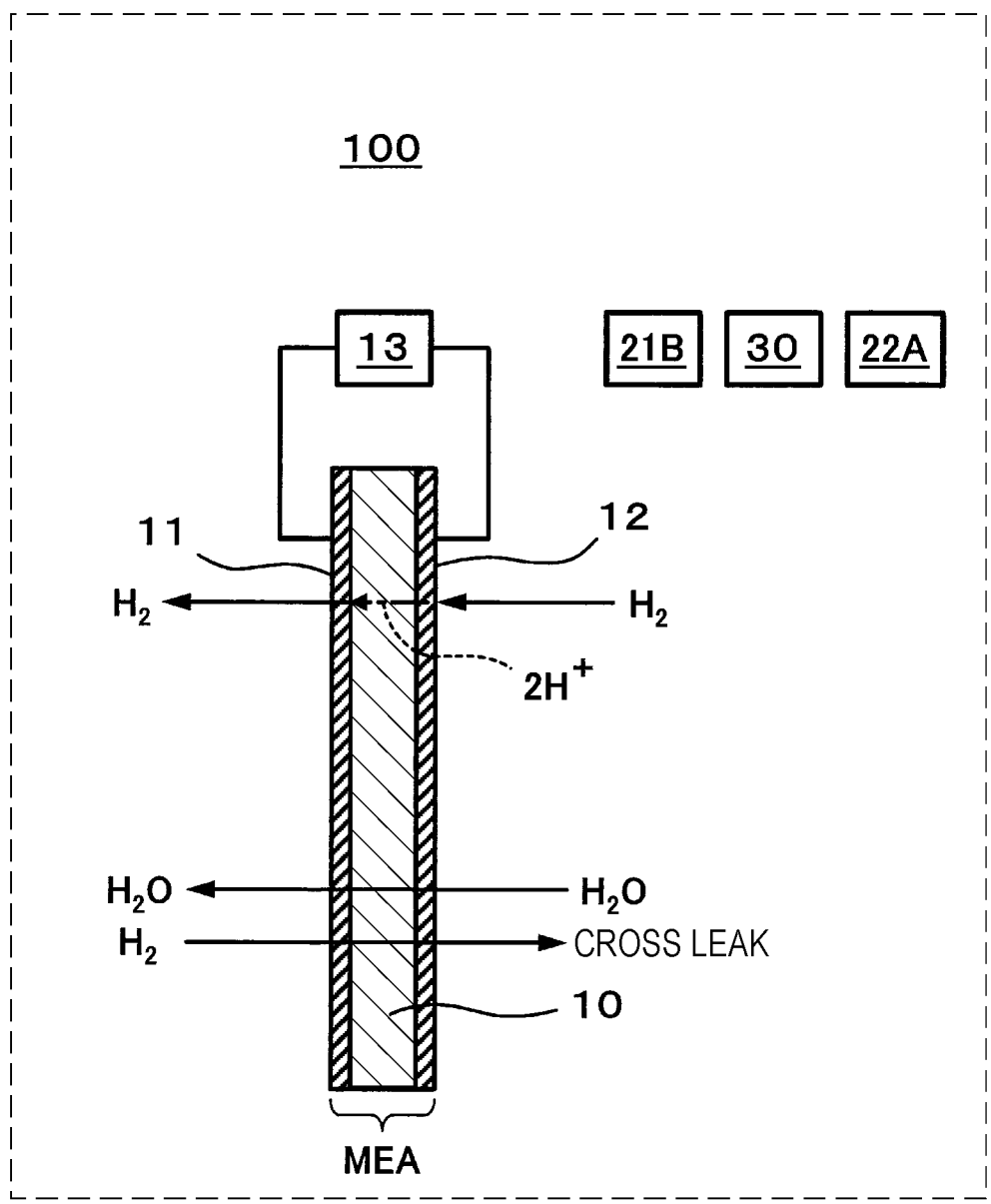
FIG. 13 illustrates one example of an electrochemical hydrogen compression apparatus according to a seventh embodiment.

FIG. 13 illustrates one example of an electrochemical hydrogen compression apparatus according to a seventh embodiment.

In the example illustrated in FIG. 13, the electrochemical hydrogen compression apparatus 100 includes a proton-conducting electrolyte membrane 10, a cathode 11, an anode 12, a voltage applicator 13, an annunciator 21B, and an estimator 22A.

The proton-conducting electrolyte membrane 10, the cathode 11, the anode 12, and the voltage applicator 13 are similar to those in the first embodiment, and hence description of those components is omitted. Moreover, the annunciator 21B is similar to that in the sixth embodiment, and hence description of the annunciator 21B is omitted.

The estimator 22A estimates the deterioration of the proton-conducting electrolyte membrane 10 from at least one of the number of hydrogen-gas compressions at the cathode 11 and the number of high-pressure hydrogen-gas releases at the cathode 11.

The estimator 22A may be of any suitable configuration insofar as it is able to estimate the deterioration of the proton-conducting electrolyte membrane 10 from at least one of the number of hydrogen compressions at the cathode 11 and the number of high-pressure hydrogen releases at the cathode 11. By way of example, the estimator 22A may include a counter that counts at least one of the number of hydrogen compressions at the cathode 11 and the number of high-pressure hydrogen releases at the cathode 11. In that case, when at least one of the number of hydrogen compressions and the number of high-pressure hydrogen releases reaches a predetermined value, the estimator 22A may estimate that the deterioration of the proton-conducting electrolyte membrane 10 has progressed. The estimator 22A may include, for example, an arithmetic circuit (not illustrated) and a storage circuit (not illustrated) that stores an estimation program.

A controller (not illustrated in FIG. 13) may control the annunciator 21B to issue the information denoting the progress of the deterioration of the proton-conducting electrolyte membrane 10 as being advanced when it is determined, from the estimation made by the estimator 22A on the deterioration of the proton-conducting electrolyte membrane 10, that the deterioration of the proton-conducting electrolyte membrane 10 has progressed. Instead of employing the estimator 22A, the controller may include an estimation function unit corresponding to the estimator 22A.

Thus, the electrochemical hydrogen compression apparatus 100 according to the seventh embodiment makes it possible to appropriately estimate the deterioration of the proton-conducting electrolyte membrane 10 from at least one of the number of hydrogen compressions at the cathode 11 and the number of high-pressure hydrogen releases at the cathode 11.

Other features of the electrochemical hydrogen compression apparatus 100 according to the seventh embodiment than the above-described features may be similar to those of the electrochemical hydrogen compression apparatus 100 according to any of the first embodiment, the first and second examples of the first embodiment, the second embodiment, the third embodiment, the first and second examples of the third embodiment, the fourth embodiment, the modification of the fourth embodiment, the fifth embodiment, and the sixth embodiment.

Modification

As described above, the deterioration of the proton-conducting electrolyte membrane 10 can be estimated from at least one of the number of hydrogen compressions at the cathode 11 and the number of high-pressure hydrogen releases at the cathode 11. Here, the hydrogen compression and the high-pressure hydrogen releases at the cathode 11 are each a phenomenon that is generated with the startup and the stop of the electrochemical hydrogen compression apparatus 100.

Taking into consideration the above point, the inventors have found that the deterioration of the proton-conducting electrolyte membrane 10 can be estimated from at least one of the number of startups and the number of stops of the electrochemical hydrogen compression apparatus 100.

Figure 14:
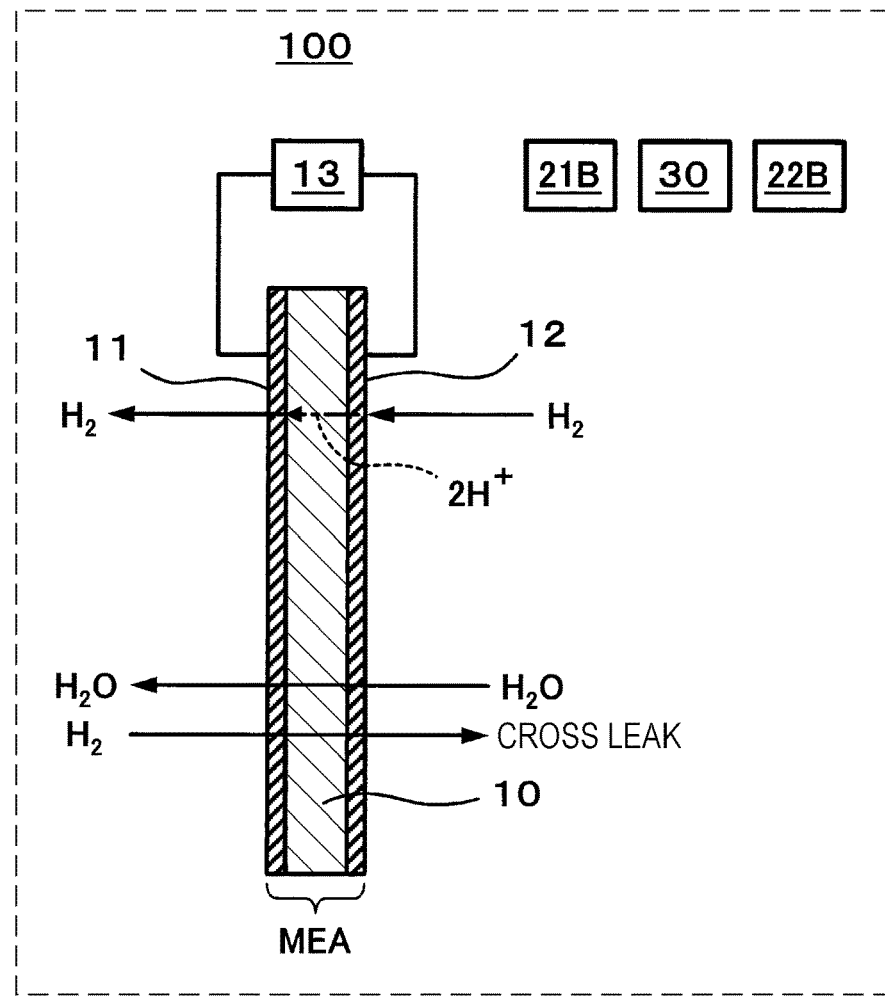
FIG. 14 illustrates one example of an electrochemical hydrogen compression apparatus according to a modification of the seventh embodiment.
Figure 15:
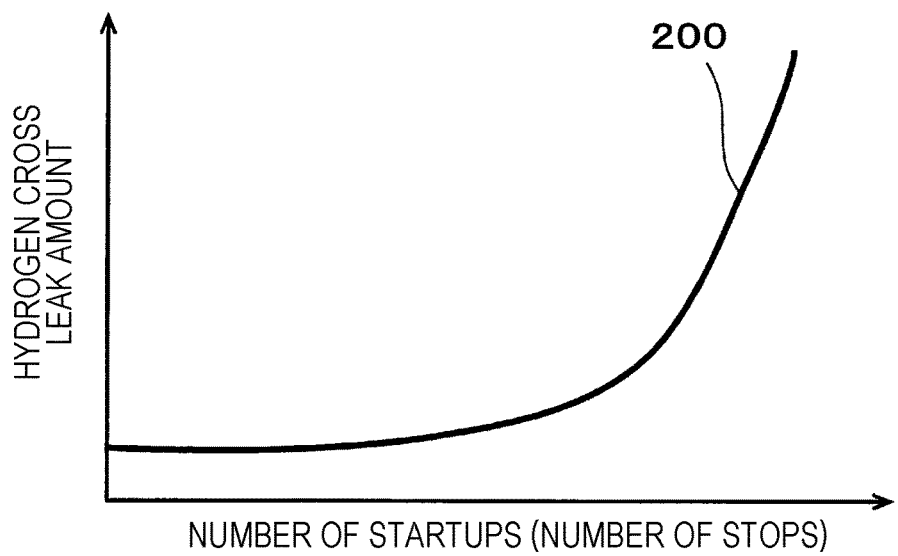
FIG. 15 is a graph depicting one example of operation of the electrochemical hydrogen compression apparatus according to the modification of the seventh embodiment.

FIG. 14 illustrates one example of an electrochemical hydrogen compression apparatus according to a modification of the seventh embodiment. FIG. 15 is a graph depicting one example of operation of the electrochemical hydrogen compression apparatus according to the modification of the seventh embodiment.

In the example illustrated in FIG. 14, the electrochemical hydrogen compression apparatus 100 includes a proton-conducting electrolyte membrane 10, a cathode 11, an anode 12, a voltage applicator 13, an annunciator 21B, and an estimator 22B. The proton-conducting electrolyte membrane 10, the cathode 11, the anode 12, and the voltage applicator 13 are similar to those in the first embodiment, and hence description of those components is omitted. Moreover, the annunciator 21B is similar to that in the sixth embodiment, and hence description of the annunciator 21B is omitted.

The estimator 22B estimates the deterioration of the proton-conducting electrolyte membrane 10 from at least one of the number of startups and the number of stops of the electrochemical hydrogen compression apparatus 100. Details of the estimator 22B are not described here because they can be easily understood by referring to the above description of the estimator 22A in the seventh embodiment.

A controller (not illustrated in FIG. 14) may control the annunciator 21B to issue the information denoting the progress of the deterioration of the proton-conducting electrolyte membrane 10 as being advanced when it is determined, from the estimation made by the estimator 22B on the deterioration of the proton-conducting electrolyte membrane 10, that the deterioration of the proton-conducting electrolyte membrane 10 has progressed. Instead of employing the estimator 22B, the controller may include an estimation function unit corresponding to the estimator 22B.

A profile 200 in FIG. 15 represents correlation between the number of startups (or stops) of the electrochemical hydrogen compression apparatus 100 and the hydrogen cross leak amount. As seen from the profile 200, as the number of startups (or stops) of the electrochemical hydrogen compression apparatus 100 increases, the hydrogen cross leak amount increases. When the number of startups (or stops) of the electrochemical hydrogen compression apparatus 100 increases to a certain value, for example, the hydrogen cross leak amount starts to increase significantly. From the profile 200, it can be understood that the progress of the deterioration of the proton-conducting electrolyte membrane 10 is advanced with an increase in the number of startups (or stops) of the electrochemical hydrogen compression apparatus 100.

The hydrogen cross leak amount can be estimated by suitable one of various methods. In an example, as described above, the hydrogen cross leak amount may be detected by the first detector 30 in the first embodiment.

In another example, nitrogen gas ($N_2$) in a state saturated with water vapor may be supplied to the anode 12 at a flow rate of 300 mL/min, and hydrogen gas ($H_2$) in a state saturated with water vapor may be supplied to the cathode 11 at a flow rate of 300 mL/min. The outlet of the cathode 11 is controlled by a flow control valve (e.g., a needle valve) to raise the pressure at the cathode 11. The hydrogen cross leak amount can be measured by analyzing the hydrogen gas leaking to the anode 12 in the above state with gas chromatography. On that occasion, respective pressures in the chambers accommodating the cathode 11 and the anode 12 are measured. Moreover, the electrochemical hydrogen compression apparatus 100 may be stopped by suitable one of various methods depending on the specifications of the electrochemical hydrogen compression apparatus. By way of example, the electrochemical hydrogen compression apparatus may be stopped by purging the interior of the apparatus with inert gas, such as rare gas or nitrogen gas.

The above-mentioned values of gas flow rates, etc. are merely illustrative, and they are not limited to those examples.

The number of startups (or stops) of the electrochemical hydrogen compression apparatus 100 at which the hydrogen cross leak amount starts to increase is different depending on various conditions, such as the method of starting up and stopping the electrochemical hydrogen compression apparatus 100, the type of the proton-conducting electrolyte membrane 10, and the pressures in the chambers accommodating the cathode and the anode. However, change of the hydrogen cross leak amount with respect to the number of startups (or stops) of the electrochemical hydrogen compression apparatus 100 can be appropriately estimated by setting those conditions to be the same.

Thus, the electrochemical hydrogen compression apparatus 100 according to this modification makes it possible to appropriately estimate the deterioration of the proton-conducting electrolyte membrane 10 from at least one of the number of startups and the number of stops of the electrochemical hydrogen compression apparatus 100.

Other features of the electrochemical hydrogen compression apparatus 100 according to this modification than the above-described features may be similar to those of the electrochemical hydrogen compression apparatus 100 according to the seventh embodiment.

Eighth Embodiment

When hydrogen gas is compressed at the cathode with the electrochemical hydrogen compression, the cathode chamber accommodating the cathode under a high-pressure state needs to be properly sealed off for a long period. Furthermore, in view of a possibility that hydrogen gas leaks to the outside from the cathode chamber, a leak of the hydrogen gas to the outside needs to be detected. The leak of the hydrogen gas to the outside can be detected, for example, by a method of installing hydrogen sensors around the cell. However, installing a fairly larger number of hydrogen sensors is disadvantageous in increasing the cost and causing a trouble that the leak of the hydrogen gas cannot be detected if any hydrogen sensor is failed.

As described above, Japanese Patent No. 5341547 proposes a method of detecting a leak of hydrogen gas from the cathode to the anode through the electrolyte on the basis of time-dependent change of data detected by a pressure gauge.

Just on the basis of the time-dependent change of the data detected by the pressure gauge, however, it is difficult to exactly determine not only the hydrogen cross leak amount, but also an amount of the hydrogen gas leaking to the outside from the cathode (hereinafter simply referred to as a "hydrogen outside leak amount" in some cases). The reason is that the time-dependent change of the data detected by the pressure gauge includes a contribution of the hydrogen cross leak amount and a contribution of the hydrogen outside leak amount.

Taking into consideration the above point, the inventors have gained the conception of appropriately detecting the hydrogen outside leak amount by measuring the hydrogen cross leak amount with the first detector 30 in the first embodiment.

Figure 16:
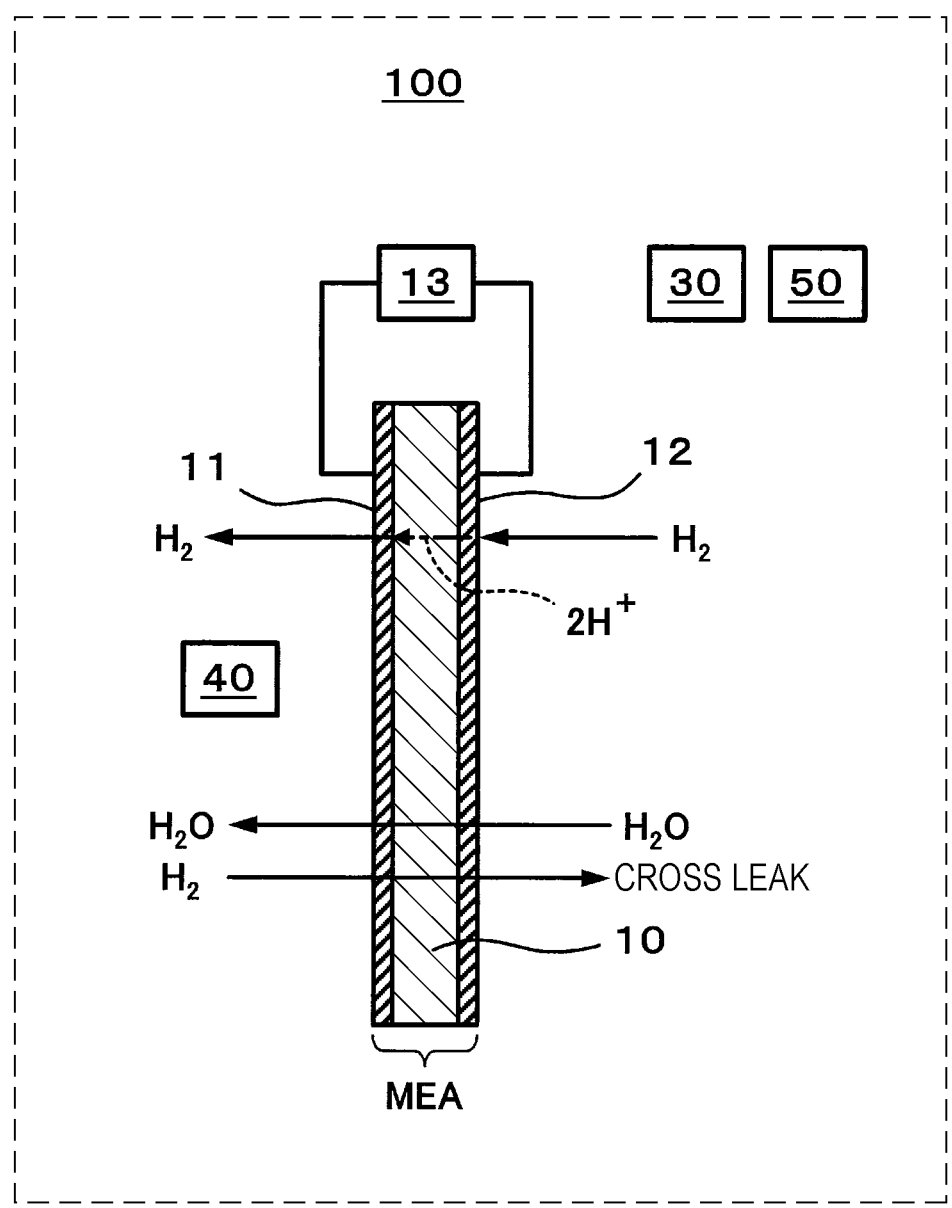
FIG. 16 illustrates one example of an electrochemical hydrogen compression apparatus according to an eighth embodiment.

FIG. 16 illustrates one example of an electrochemical hydrogen compression apparatus according to an eighth embodiment.

In the example illustrated in FIG. 16, the electrochemical hydrogen compression apparatus 100 includes a proton-conducting electrolyte membrane 10, a cathode 11, an anode 12, a voltage applicator 13, a first detector 30, a pressure gauge 40, and a second detector 50.

The proton-conducting electrolyte membrane 10, the cathode 11, the anode 12, the voltage applicator 13, and the first detector 30 are similar to those in the first embodiment, and hence description of those components is omitted.

The pressure gauge 40 is a device that measures a pressure in the cathode chamber (not illustrated in FIG. 16) accommodating the cathode 11. The pressure gauge 40 may be of any suitable configuration insofar as it is able to measure the pressure in the cathode chamber. The cathode chamber corresponds to the second flow path in the present disclosure.

The second detector 50 detects a leak of hydrogen to the outside from both time-dependent change of the pressure measured by the pressure gauge 40 and time-dependent change of the hydrogen cross leak amount detected by the first detector 30.

A controller (not illustrated in FIG. 16) may control an appropriate annunciator (e.g., the annunciator 21A in FIG. 11 or the annunciator 21B in FIG. 12) to issue information denoting the leak of the hydrogen gas to the outside when the leak of the hydrogen gas to the outside is detected from both the time-dependent change of the pressure measured by the pressure gauge 40 and the time-dependent change of the hydrogen cross leak amount detected by the first detector 30.

Figure 17:
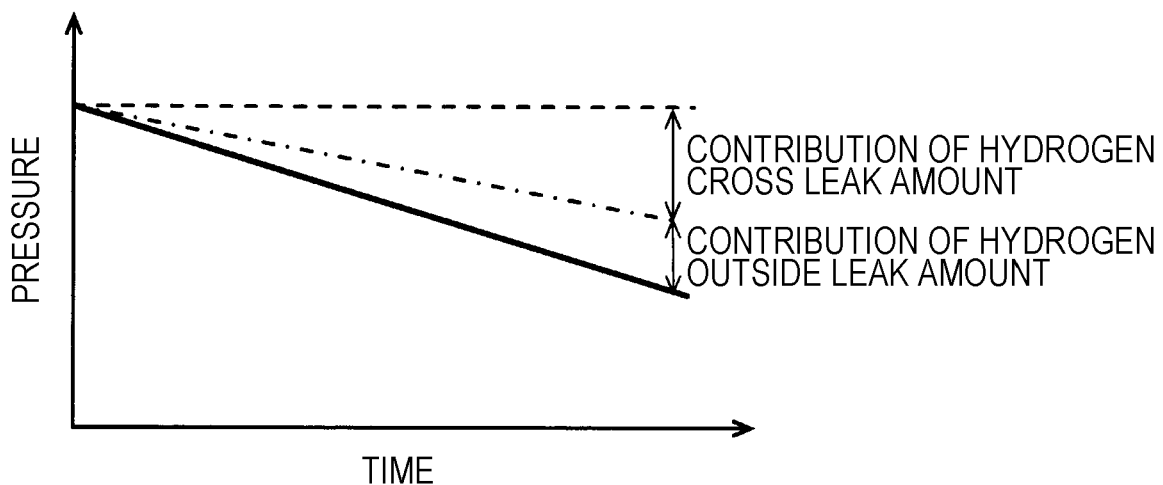
FIG. 17 is a graph depicting one example of operation of the electrochemical hydrogen compression apparatus according to the eighth embodiment.

FIG. 17 is a graph depicting one example of operation of the electrochemical hydrogen compression apparatus according to the eighth embodiment.

In FIG. 17, a solid line represents the time-dependent change of the data detected by the pressure gauge 40 (i.e., time-dependent change of the pressure in the cathode chamber) in a state where the cathode chamber accommodating the cathode 11 is pressurized by hydrogen gas and where the hydrogen drift from the anode 12 to the cathode 11 (i.e., the electrochemical hydrogen compression operation) is not performed (i.e., in an open state where the voltage applicator 13 is not connected).

In this connection, while the data detected by the pressure gauge 40 reduces with the lapse of time, an amount of change of the detected data includes both reductions due to the contribution of the hydrogen outside leak amount and due to the contribution of the hydrogen cross leak amount. In view of that point, the detection of the hydrogen leak amount by the first detector 30 is performed at appropriate timing.

Thus, the electrochemical hydrogen compression apparatus 100 according to the eighth embodiment makes it possible to appropriately estimate the contribution of the hydrogen cross leak amount with respect to the data (decrease amount) detected by the pressure gauge 40 on the basis of the time-dependent change of the hydrogen cross leak amount, which is detected by the first detector 30, and hence to appropriately determine the leak of the hydrogen gas to the outside.

A hydrogen sensor for detecting the leak of hydrogen gas to the outside is installed within the electrochemical hydrogen compression apparatus 100, but the hydrogen sensor may be failed for some reason. Thus, even if the hydrogen sensor is failed, system redundancy can be provided by appropriately determining the hydrogen outside leak amount as in the electrochemical hydrogen compression apparatus 100 according to the eighth embodiment.

While, in the above description, the contribution of the hydrogen outside leak amount is determined on the basis of the data detected by the pressure gauge 40 in the state where the cathode chamber accommodating the cathode 11 is pressurized by hydrogen gas and where the hydrogen drift from the anode 12 to the cathode 11 is not performed, the eighth embodiment is not limited to such an example.

Figure 18:
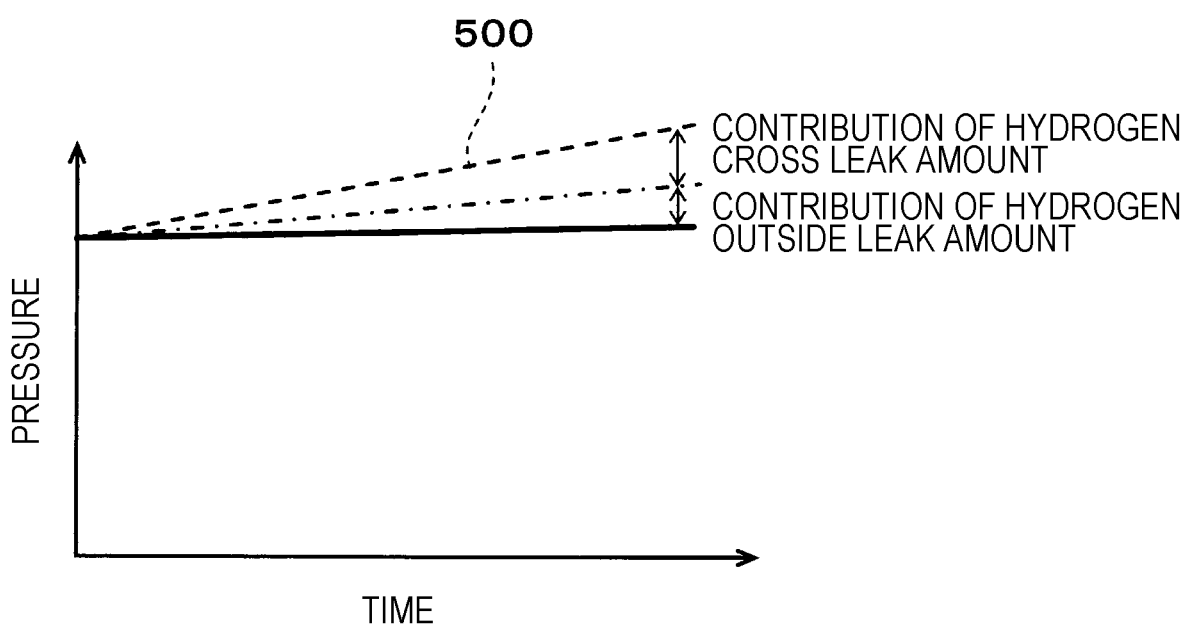
FIG. 18 is a graph depicting one example of the operation of the electrochemical hydrogen compression apparatus according to the eighth embodiment.

As another example, even during the operation of the electrochemical hydrogen compression apparatus 100 in which the hydrogen drift from the anode 12 to the cathode 11 occurs, the contribution of the hydrogen outside leak amount can be determined by a similar method to that described above with reference to FIG. 17. Because an amount of hydrogen gas drifting from the anode 12 to the cathode 11 in a state where a predetermined current flows in the MEA can be derived from, for example, the volume and the temperature distribution of the cathode 11, theoretical change of the pressure in the cathode chamber during the operation of the electrochemical hydrogen compression apparatus 100 can be estimated (see a profile 500, denoted by a dotted line in FIG. 18, representing the estimated pressure change). On the other hand, the contribution of the hydrogen cross leak amount with respect to a deviation (i.e., a decrease amount) from the profile 500 in FIG. 18 can be estimated on the basis of the time-dependent change of the hydrogen cross leak amount detected by the first detector 30. Hence the contribution of the hydrogen outside leak amount can be appropriately determined.

Thus, with the electrochemical hydrogen compression apparatus 100 according to the eighth embodiment, the contribution of the hydrogen cross leak amount with respect to the data detected by the pressure gauge 40 can be estimated on the basis of the time-dependent change of the hydrogen cross leak amount detected by the first detector 30. As a result, the leak of hydrogen to the outside can be appropriately determined by employing the second detector 50.

Other features of the electrochemical hydrogen compression apparatus 100 according to the eighth embodiment than the above-described features may be similar to those of the electrochemical hydrogen compression apparatus 100 according to any of the first embodiment, the first and second examples of the first embodiment, the second embodiment, the third embodiment, the first and second examples of the third embodiment, the fourth embodiment, the modification of the fourth embodiment, the fifth embodiment, the sixth embodiment, the seventh embodiment, and the modification of the seventh embodiment.

The first embodiment, the first and second examples of the first embodiment, the second embodiment, the third embodiment, the first and second examples of the third embodiment, the fourth embodiment, the modification of the fourth embodiment, the fifth embodiment, the sixth embodiment, the seventh embodiment, the modification of the seventh embodiment, and the eighth embodiment may be optionally combined as appropriate insofar as not contradicting with each other.

From the above description, a variety of improvements and other embodiments of the present disclosure are apparent to those skilled in the art. Accordingly, it is to be construed that the above description is presented just in an illustrative sense with intent to teach the best mode for carrying out the present disclosure to those skilled in the art. Details of the structures and/or the functions stated in the present disclosure can be substantially modified without departing from the gist of the present disclosure.

For instance, while, in the above description, the hydrogen source in the electrochemical hydrogen compression apparatus 100 is given as, e.g., hydrogen gas ($H_2$) supplied from a hydrogen gas tank under a predetermined supply pressure, or hydrogen gas ($H_2$) supplied from a hydrogen gas infrastructure under a predetermined supply pressure, the hydrogen source is not limited to those examples.

The hydrogen source is an anode fluid containing hydrogen as a constituent element. The hydrogen source may be of any type insofar as it provides a material capable of producing protons ($H^+$) at the anode 12. Examples of the hydrogen source, other than hydrogen gas ($H_2$), providing such a material may be an organic hydride and water. When the hydrogen source is an organic hydride, hydrogen is withdrawn out from the organic hydride at the anode 12 of the electrochemical hydrogen compression apparatus 100. When the hydrogen source is water, hydrogen is produced with electrolysis of the water at the anode 12 of the electrochemical hydrogen compression apparatus 100. On that occasion, a proton ($H^+$) is produced from the hydrogen, obtained as described above, at the anode 12 of the electrochemical hydrogen compression apparatus 100. The proton ($H^+$) passes through the proton-conducting electrolyte membrane 10, whereby high-pressure hydrogen gas ($H_2$) is produced at the cathode 11 of the electrochemical hydrogen compression apparatus 100.

The one general aspect of the present disclosure can be implemented as an electrochemical hydrogen compression apparatus that is able to more appropriately detect the hydrogen cross leak amount passing through a proton-conducting electrolyte membrane than the related-art techniques.

An apparatus of the present disclosure may include: a proton-conducting electrolyte membrane; an anode disposed on one principal surface of the proton-conducting electrolyte membrane; a cathode disposed on the other principal surface of the proton-conducting electrolyte membrane; a voltage applicator which applies a voltage between the anode and the cathode; and a first detector which detects a hydrogen cross leak amount passing through the proton-conducting electrolyte membrane, wherein the first detector detects the hydrogen cross leak amount from: a natural potential of one electrode of the cathode and the anode after forming a state where hydrogen is present at the one electrode and hydrogen is not present at the other electrode of the cathode and the anode; or a current flowing between the anode and the cathode when the voltage is applied from the voltage applicator in a state where an anode chamber in which the anode is accommodated and a cathode chamber in which the cathode is accommodated are both sealed off.

An apparatus of the present disclosure may further includes a determiner which determines progress of deterioration of the proton-conducting electrolyte membrane to be in an advanced state when the hydrogen cross leak amount detected by the first detector has increased with continued use of the electrochemical hydrogen compression apparatus.

An apparatus of the present disclosure may appropriately determine the progress of the deterioration of the proton-conducting electrolyte membrane by detecting the hydrogen cross leak amount passing through the proton-conducting electrolyte membrane with the first detector.

An apparatus of the present disclosure may further includes: a purger which purges hydrogen present at the other electrode with a fluid different from hydrogen; and a controller which controls the purger to purge the hydrogen present at the other electrode with the fluid at timing of detecting the hydrogen cross leak amount by the first detector.

An apparatus of the present disclosure may further includes: a first valve disposed at an inlet of the anode chamber; a second valve disposed at an outlet of the cathode chamber; and a controller which controls the first valve and the second valve, wherein an outlet of the anode chamber is sealed off, and the controller closes the first valve and the second valve to seal off both the anode chamber and the cathode chamber, at timing of detecting the hydrogen cross leak amount by the first detector.

An apparatus of the present disclosure may further includes: a first valve disposed at an inlet of the anode chamber; a second valve disposed at an outlet of the cathode chamber; a third valve disposed at an outlet of the anode chamber; and a controller which controls the first valve, the second valve, and the third valve, wherein the controller closes the first valve, the second valve, and the third valve to seal off both the anode chamber and the cathode chamber, at timing of detecting the hydrogen cross leak amount by the first detector.

An apparatus of the present disclosure may further includes: an annunciator which issues information denoting an increase in the hydrogen cross leak amount when the hydrogen cross leak amount detected by the first detector has increased.

An apparatus of the present disclosure may further includes: an annunciator which issues information denoting progress of the deterioration of the proton-conducting electrolyte membrane as being advanced when the determiner determines which the deterioration of the proton-conducting electrolyte membrane has progressed.

An apparatus of the present disclosure may further includes: a pressure gauge which measures a pressure in the cathode chamber; and a second detector which detects a leak of hydrogen to outside from both time-dependent change of the pressure measured by the pressure gauge and from time-dependent change of the hydrogen cross leak amount detected by the first detector.

What is claimed is:

1. An apparatus comprising:
   a proton-conducting electrolyte membrane;
   an anode disposed on one principal surface of the proton-conducting electrolyte membrane;
   a first flow path which is disposed on the anode and through which an anode fluid containing hydrogen as a constituent element flows;
   a cathode disposed on the other principal surface of the proton-conducting electrolyte membrane;
   a second flow path which is disposed on the cathode and through which hydrogen flows;
   a voltage applicator which applies a voltage between the anode and the cathode;
   a first detector which detects a hydrogen cross leak amount passing through the proton-conducting electrolyte membrane; and
   a controller including a processor and a storage unit storing a control program, wherein the control program, when executed by the processor,
   causes the controller to cause the first detector to detect the hydrogen cross leak amount from:
   a current flowing between the anode and the cathode when the voltage is applied from the voltage applicator in a state where the first flow path and the second flow path are both sealed off.

2. The apparatus according to claim 1, further comprising a determiner, wherein the control program further causes the controller to cause the determiner to determine progress of deterioration of the proton-conducting electrolyte membrane to be in an advanced state when the hydrogen cross leak amount detected by the first detector has increased with continued use of the apparatus.

3. The apparatus according to claim 1, wherein the control program further causes the controller to cause the first detector to detect the hydrogen cross leak amount at timing of at least one of startup and stop of the apparatus.

4. The apparatus according to claim 1, further comprising:
   a purger which purges hydrogen present at the other electrode with a fluid different from hydrogen,
   wherein the control program further causes the controller to cause the purger to purge the hydrogen present at the other electrode with the fluid at timing of detecting the hydrogen cross leak amount by the first detector.

5. The apparatus according to claim 1, further comprising:
   a first valve disposed at an inlet of the first flow path; and
   a second valve disposed at an outlet of the second flow path,
   wherein an outlet of the first flow path is sealed off, and the control program further causes the controller to close the first valve and the second valve to seal off both the first flow path and the second flow path, at timing of detecting the hydrogen cross leak amount by the first detector.

6. The apparatus according to claim 1, further comprising:
   a first valve disposed at an inlet of the first flow path;
   a second valve disposed at an outlet of the second flow path; and
   a third valve disposed at an outlet of the first flow path,
   wherein the control program further causes the controller to close the first valve, the second valve, and the third valve to seal off both the first flow path and the second flow path, at timing of detecting the hydrogen cross leak amount by the first detector.

7. The apparatus according to claim 1, further comprising an annunciator, wherein the control program further causes the controller to cause the annunciator to issue information denoting an increase in the hydrogen cross leak amount when the hydrogen cross leak amount detected by the first detector has increased.

8. The apparatus according to claim 2, further comprising an annunciator, wherein the control program further causes the controller to cause the annunciator to issue information denoting progress of the deterioration of the proton-conducting electrolyte membrane as being advanced when the determiner determines which the deterioration of the proton-conducting electrolyte membrane has progressed.

9. The apparatus according to claim 1, further comprising:
a pressure gauge, wherein the control program further causes the controller to cause the pressure gauge to measure a pressure in the second flow path; and
a second detector, wherein the control program further causes the controller to cause the second detector to detect a leak of hydrogen to outside from both time-dependent change of the pressure measured by the pressure gauge and from time-dependent change of the hydrogen cross leak amount detected by the first detector.

10. The apparatus according to claim 1, further comprising:
a first valve disposed at an inlet of an anode chamber in which the anode is accommodated; and
a second valve disposed at an outlet of a cathode chamber in which the cathode is accommodated,
wherein an outlet of the anode chamber is sealed off, and the control program further causes the controller to cause the first valve and the second valve to seal off both the anode chamber and the cathode chamber, at timing of detecting the hydrogen cross leak amount by the first detector.

11. The apparatus according to claim 1, further comprising:
a first valve disposed at an inlet of an anode chamber in which the anode is accommodated;
a second valve disposed at an outlet of a cathode chamber in which the cathode is accommodated; and
a third valve disposed at an outlet of the anode chamber,
wherein the control program further causes the controller to close the first valve, the second valve, and the third valve to seal off both the anode chamber and the cathode chamber, at timing of detecting the hydrogen cross leak amount by the first detector.

12. The apparatus according to claim 1, further comprising:
a pressure gauge, wherein the control program further causes the controller to cause the pressure gauge to measure a pressure in a cathode chamber in which the cathode is accommodated; and
a second detector, wherein the control program further causes the controller to cause the second detector to detect a leak of hydrogen to outside from both time-dependent change of the pressure measured by the pressure gauge and from time-dependent change of the hydrogen cross leak amount detected by the first detector.

* * * * *